June 3, 1930.  J. R. PEIRCE  1,761,741
RECORD COMPARING AND POSTING MACHINE
Filed Jan. 8, 1923   28 Sheets-Sheet 1

June 3, 1930.  J. R. PEIRCE  1,761,741
RECORD COMPARING AND POSTING MACHINE
Filed Jan. 8, 1923  28 Sheets-Sheet 2

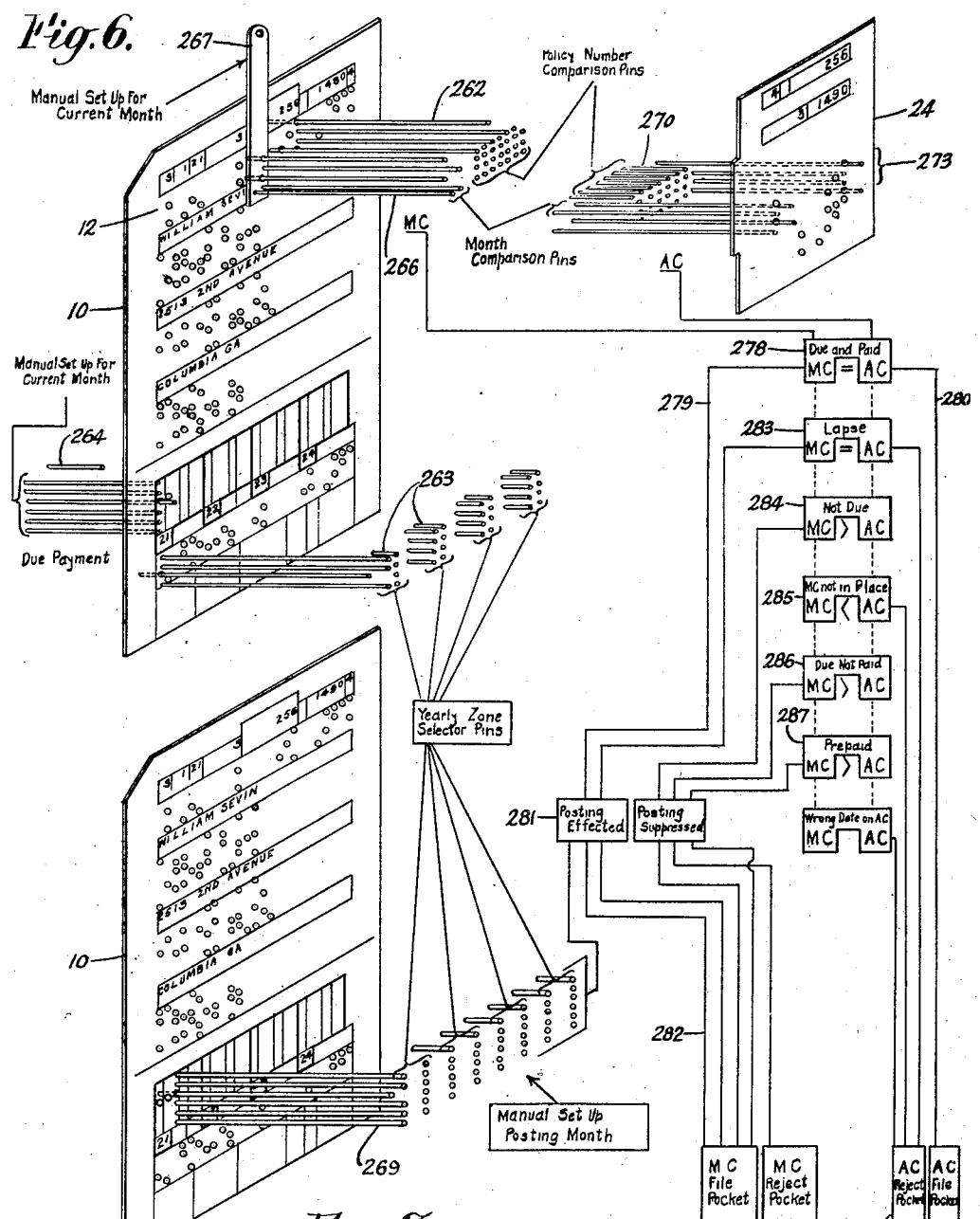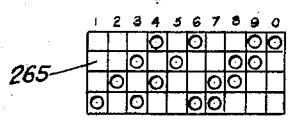

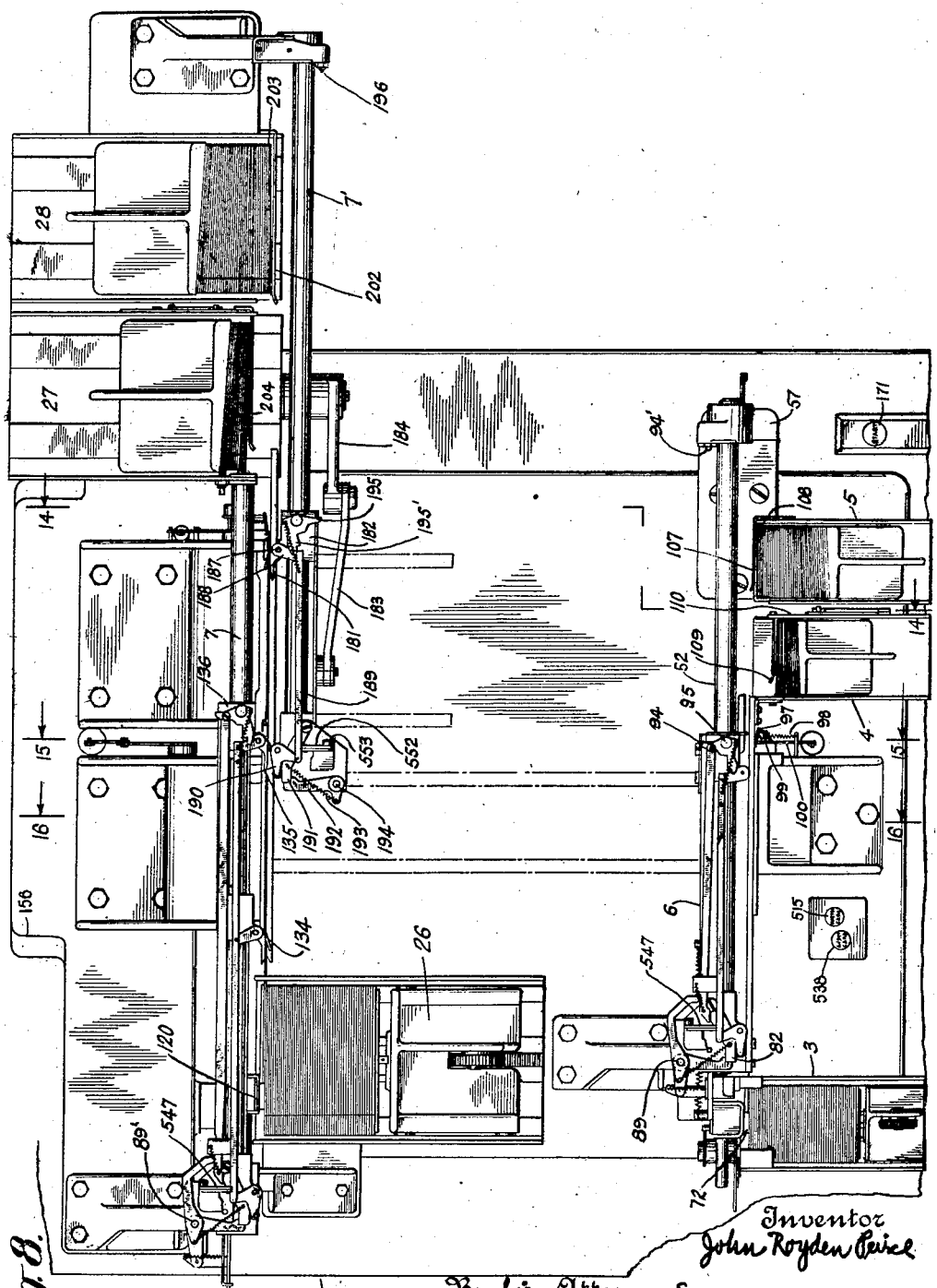

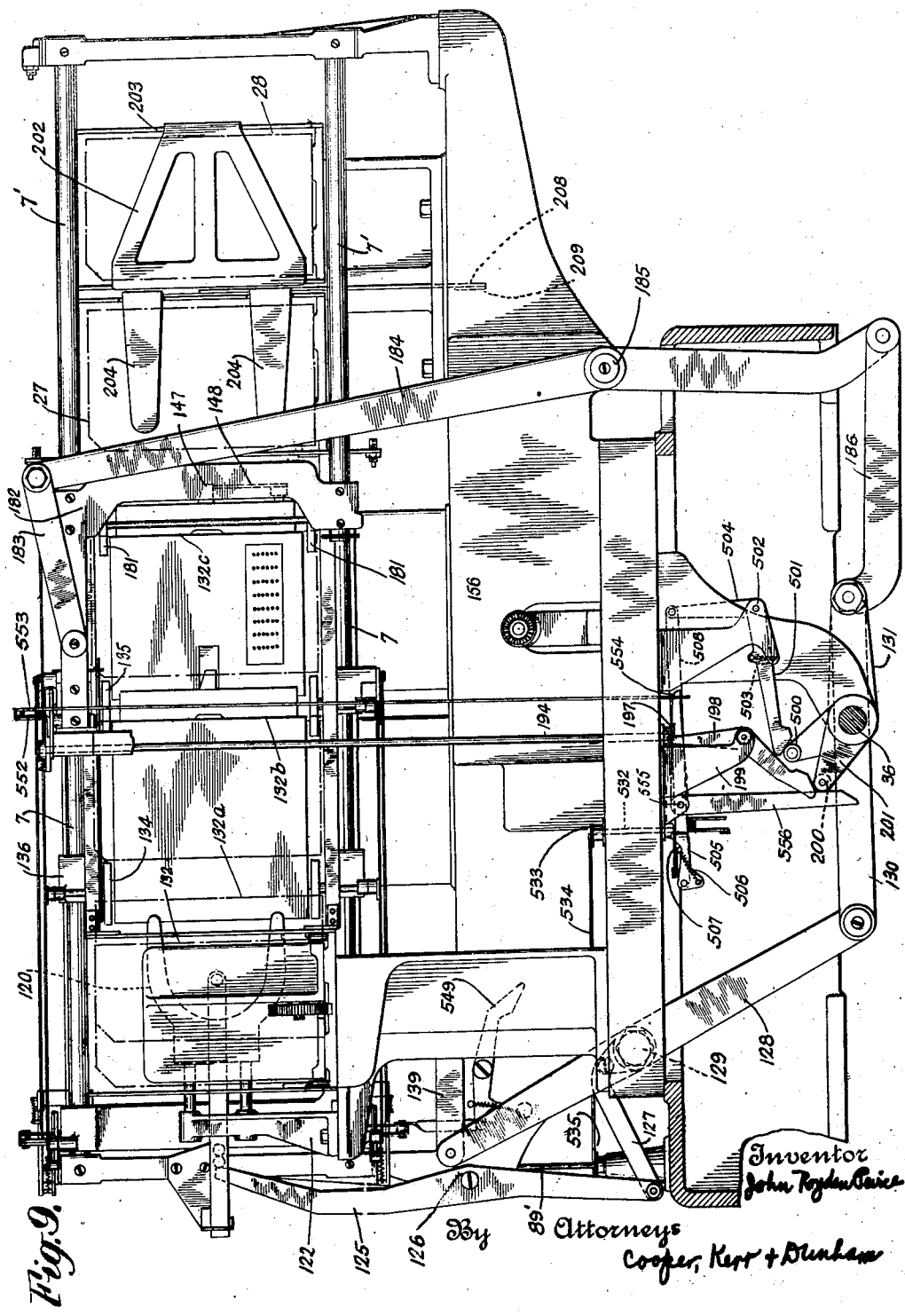

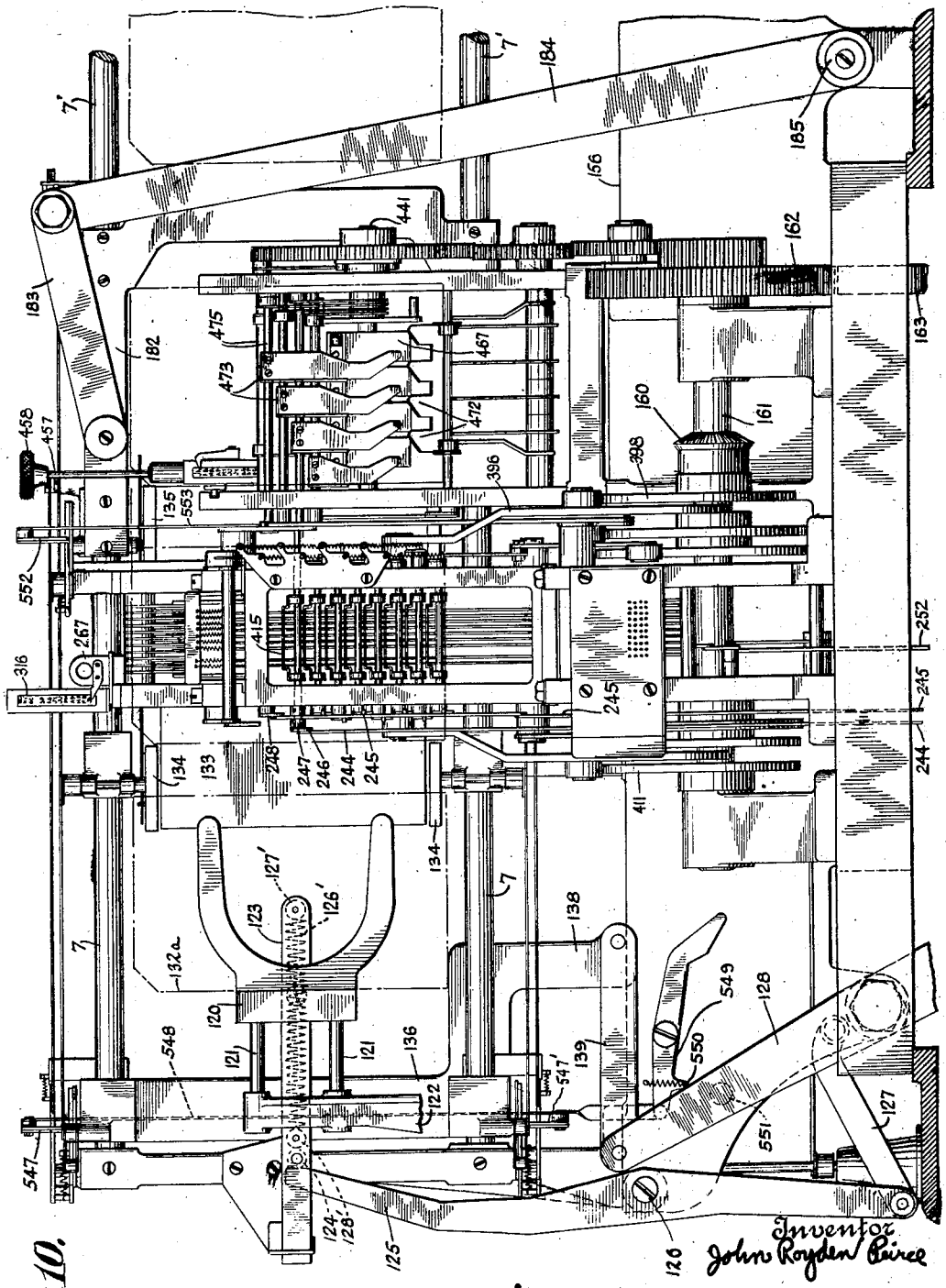

June 3, 1930.  J. R. PEIRCE  1,761,741
RECORD COMPARING AND POSTING MACHINE
Filed Jan. 8, 1923   28 Sheets-Sheet 7

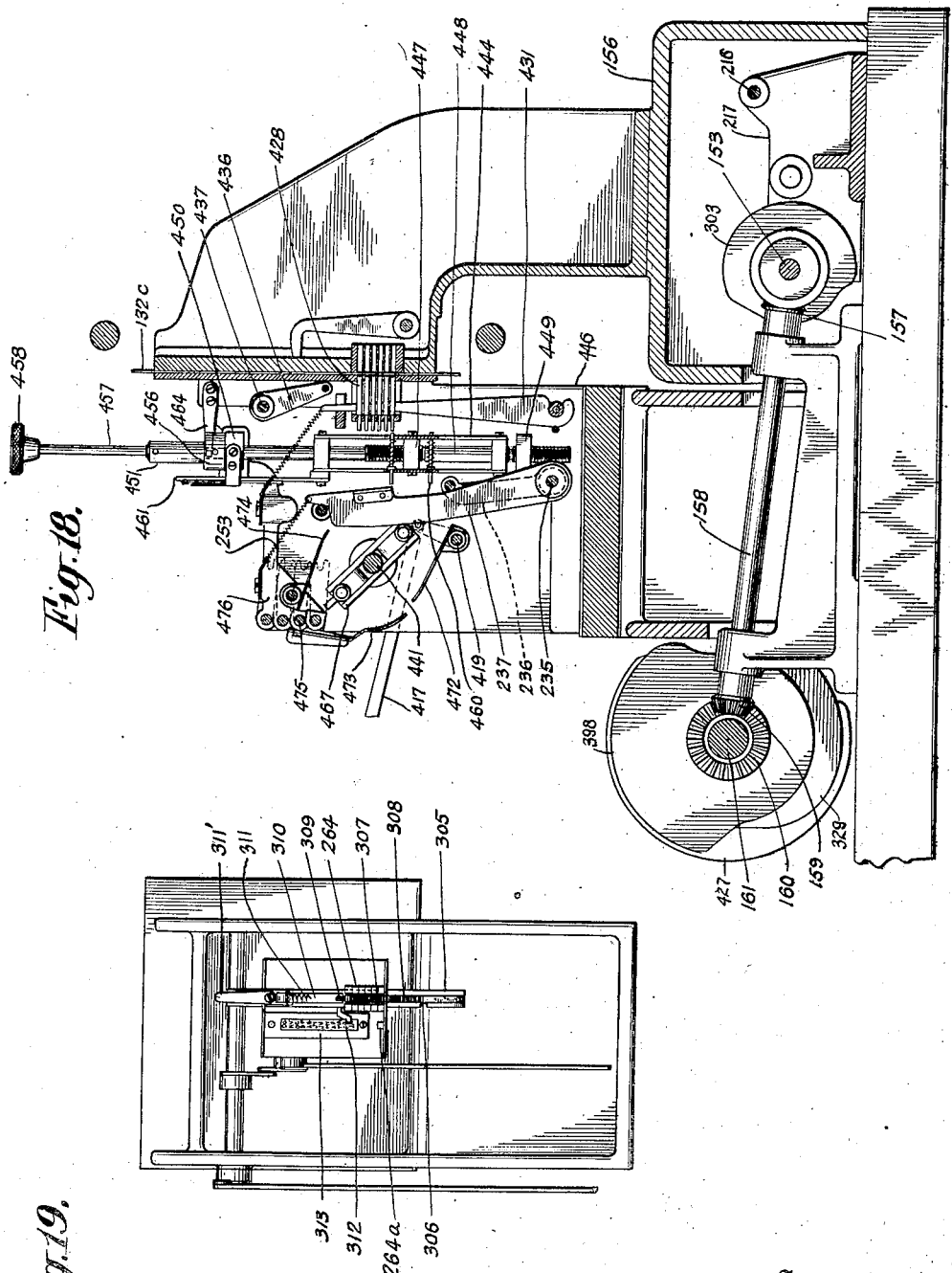

June 3, 1930. J. R. PEIRCE 1,761,741
RECORD COMPARING AND POSTING MACHINE
Filed Jan. 8, 1923 28 Sheets-Sheet 15
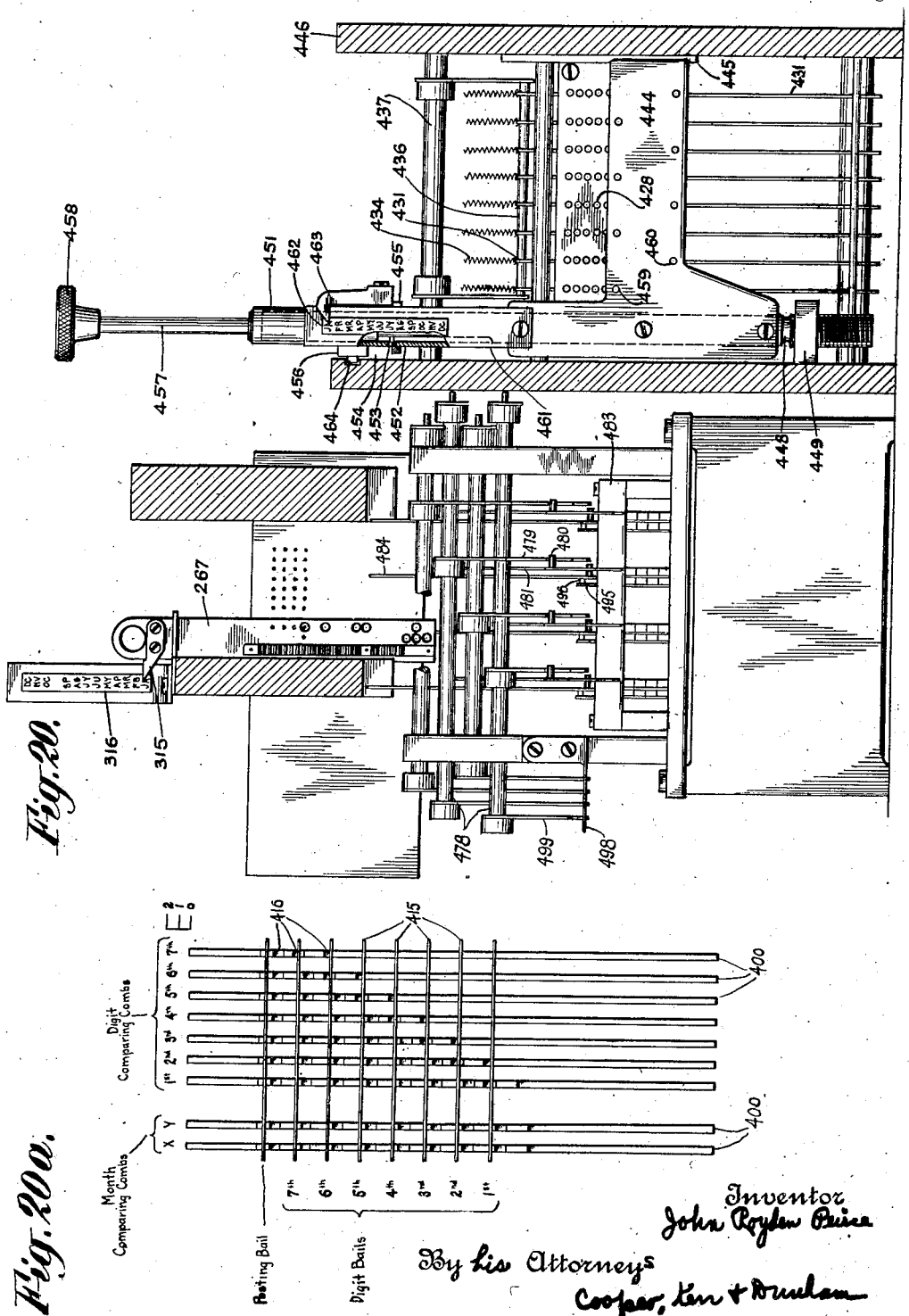

June 3, 1930.                J. R. PEIRCE                1,761,741
                RECORD COMPARING AND POSTING MACHINE
                  Filed Jan. 8, 1923.    28 Sheets-Sheet 16

Inventor
John Royden Peirce
By his Attorneys
Cooper, Kerr + Dunham

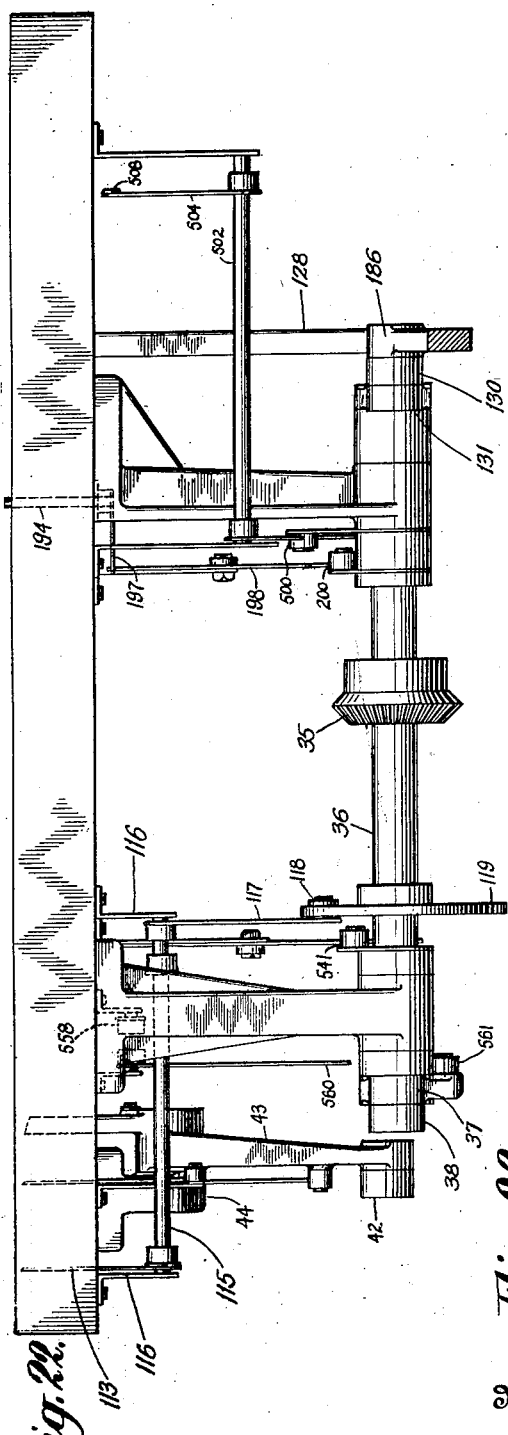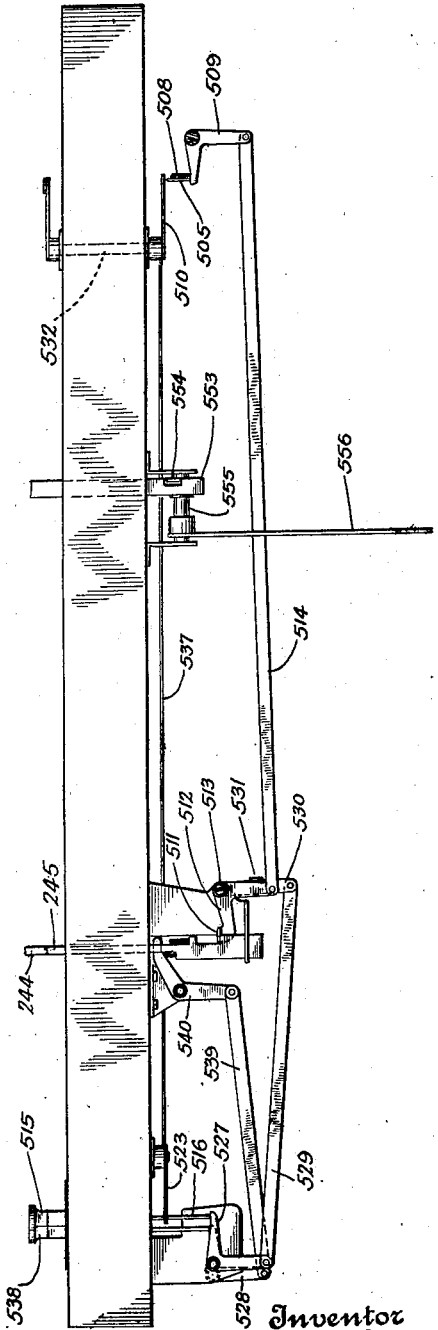

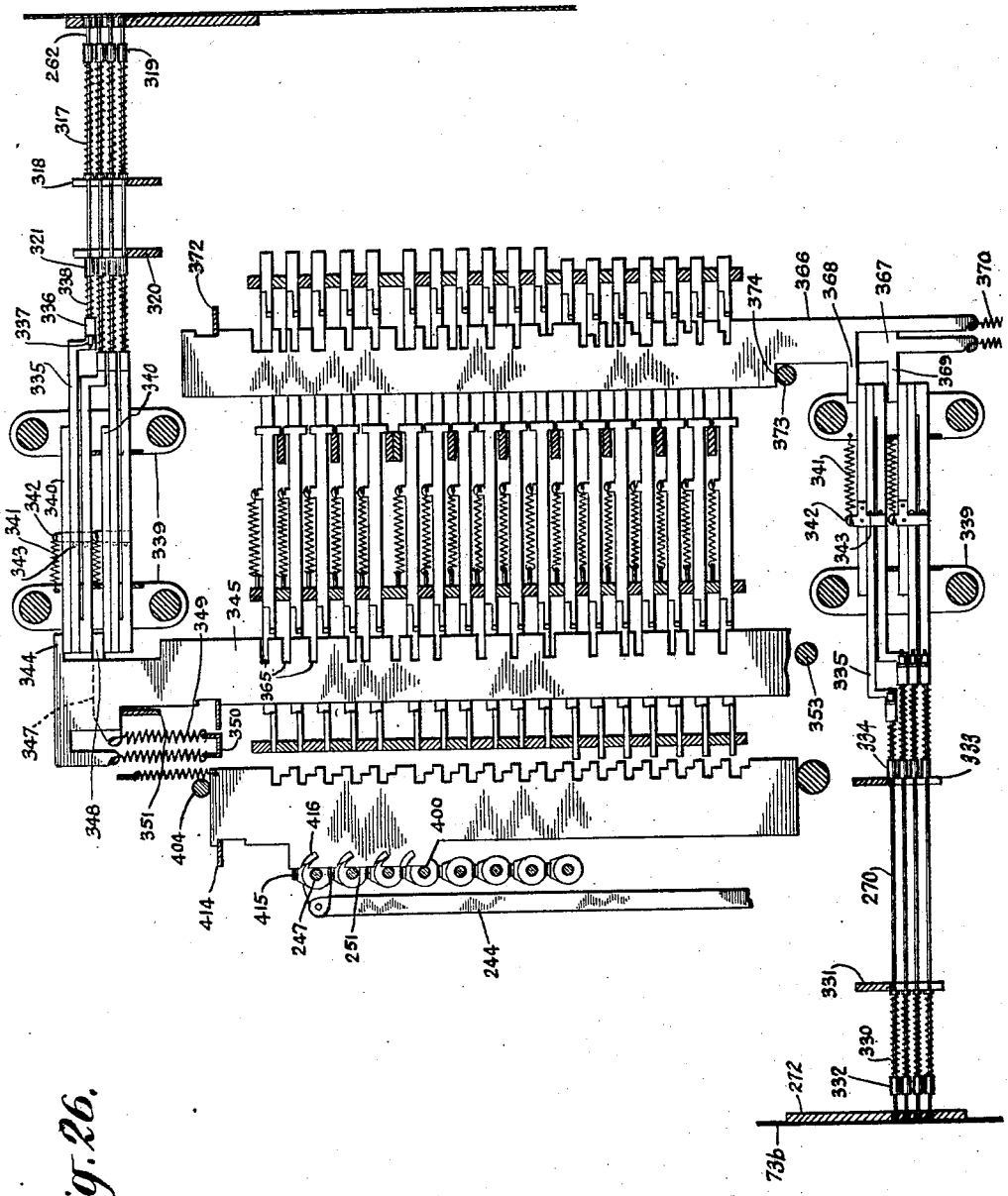

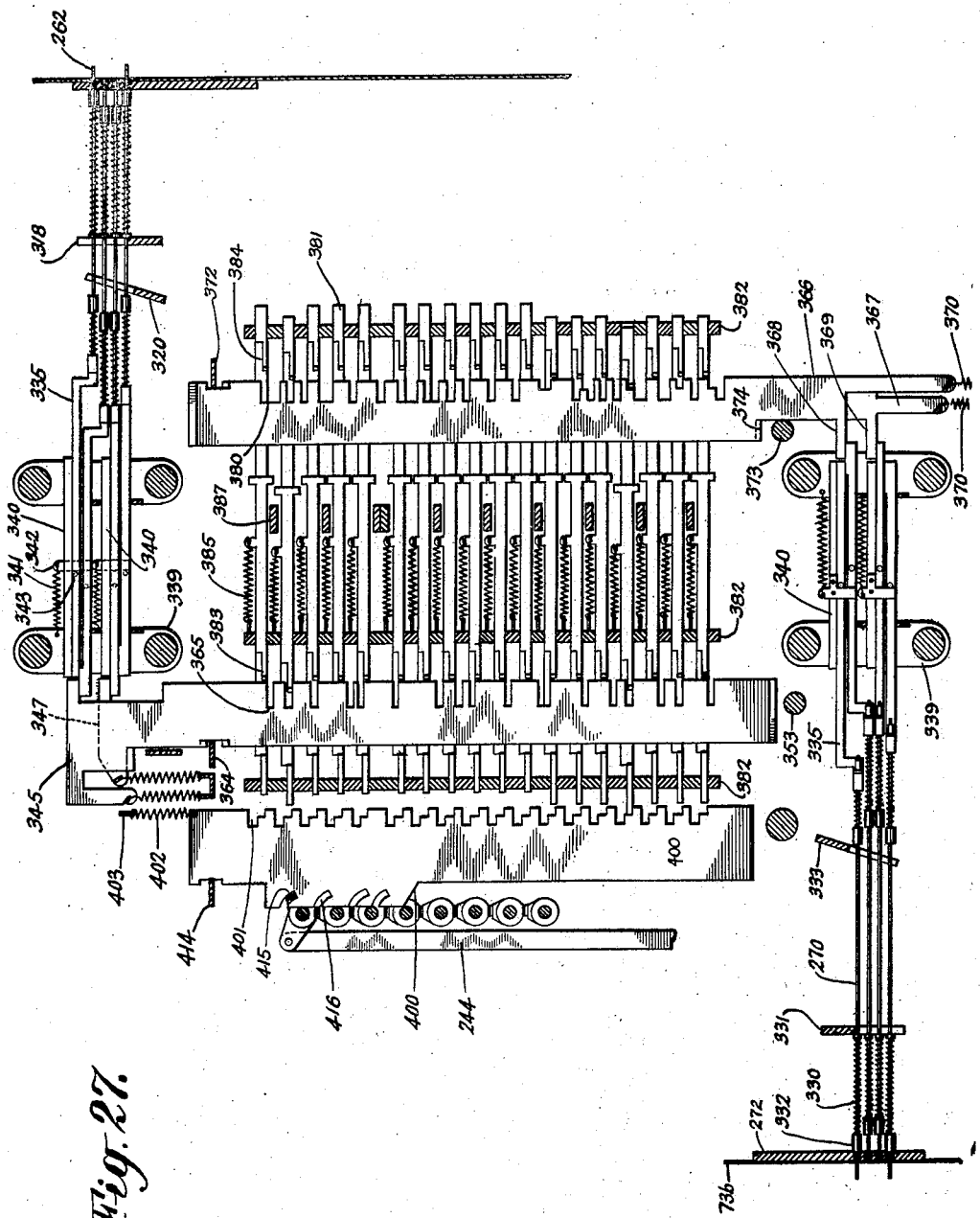

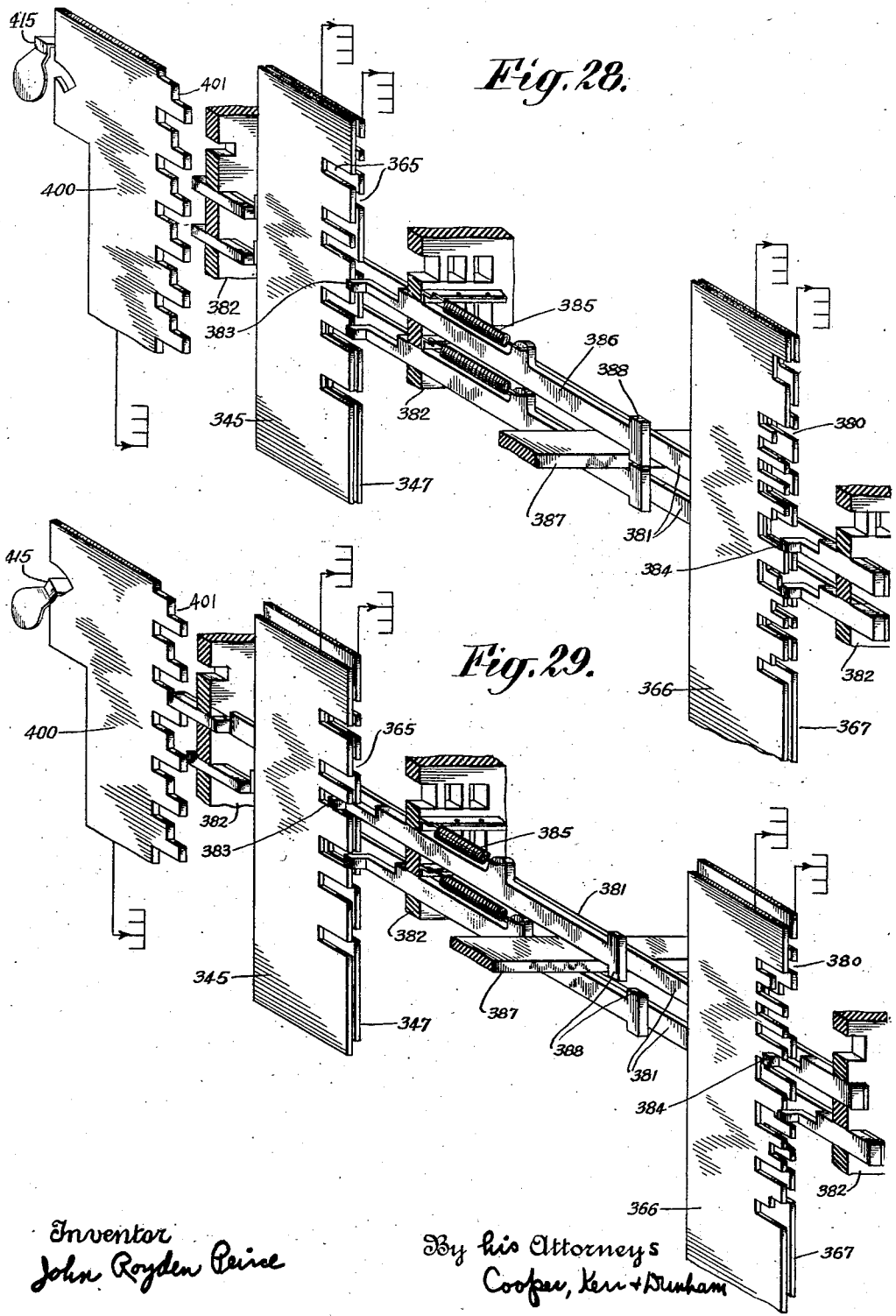

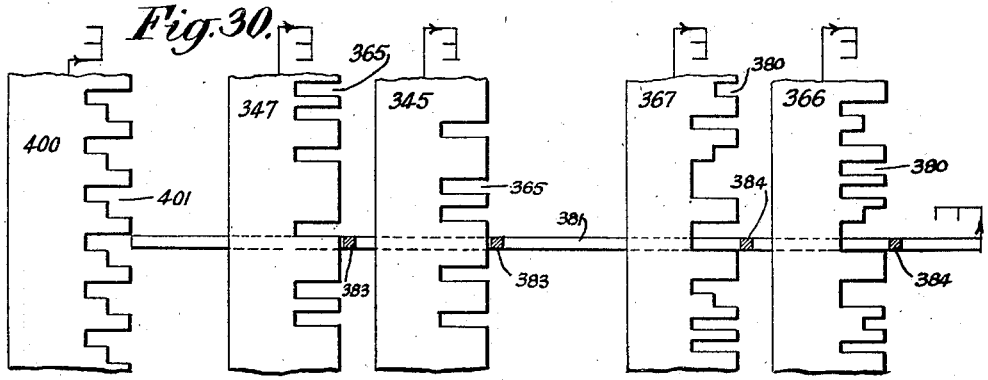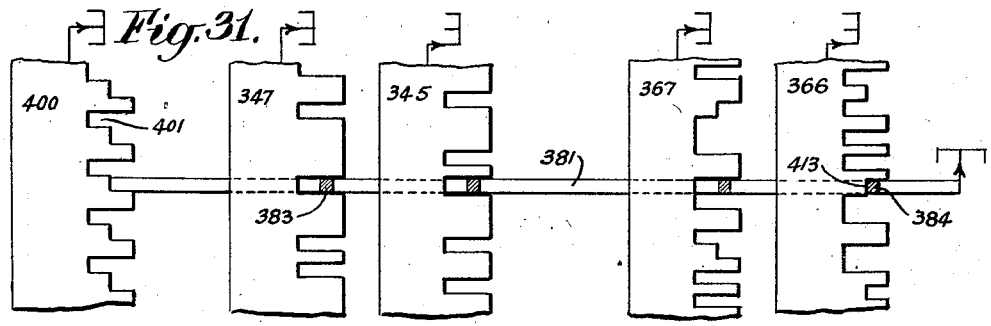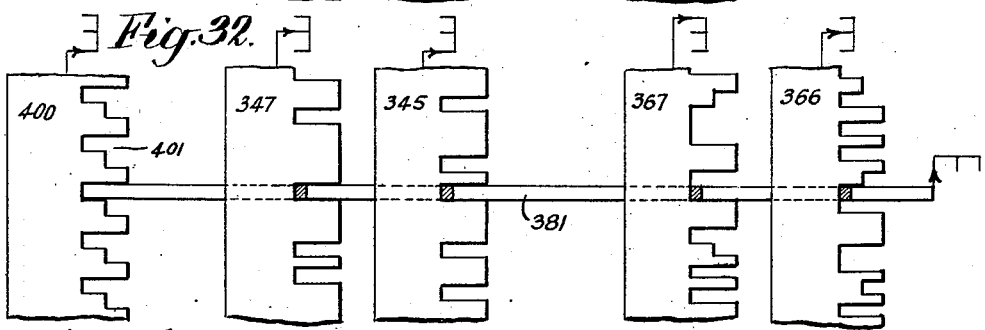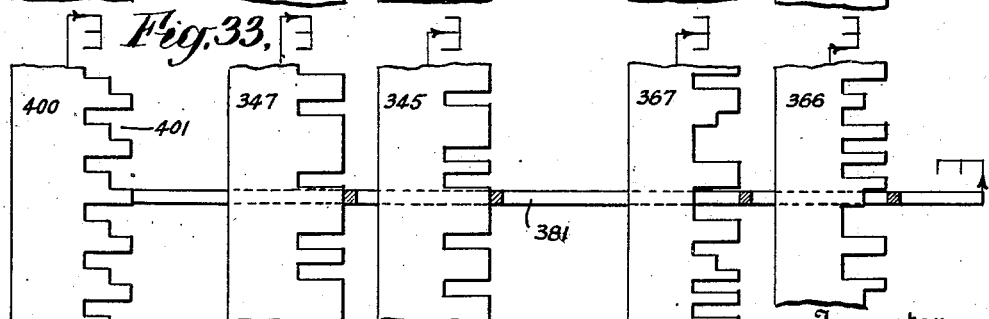

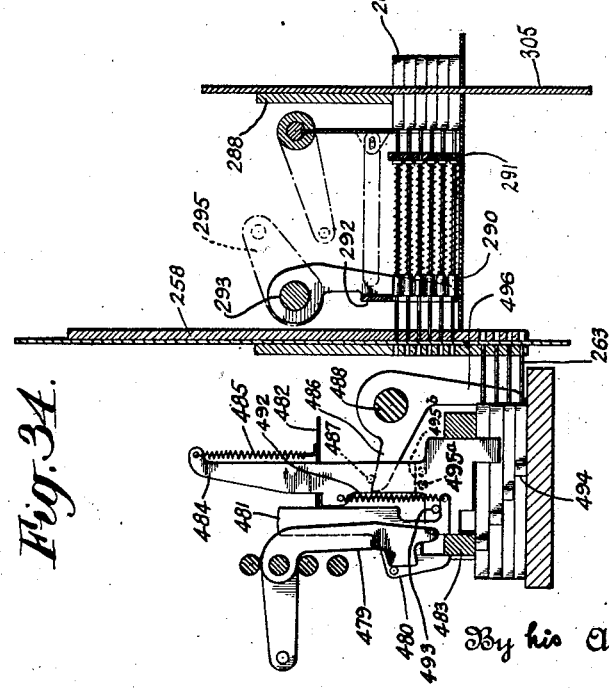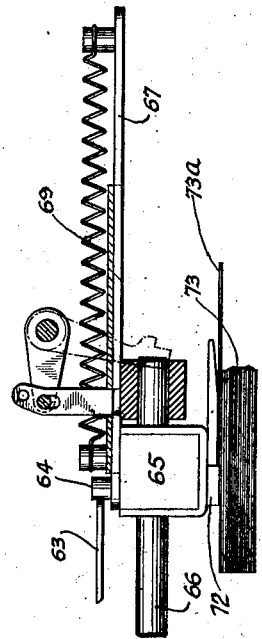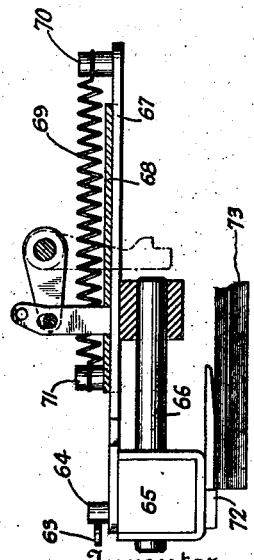

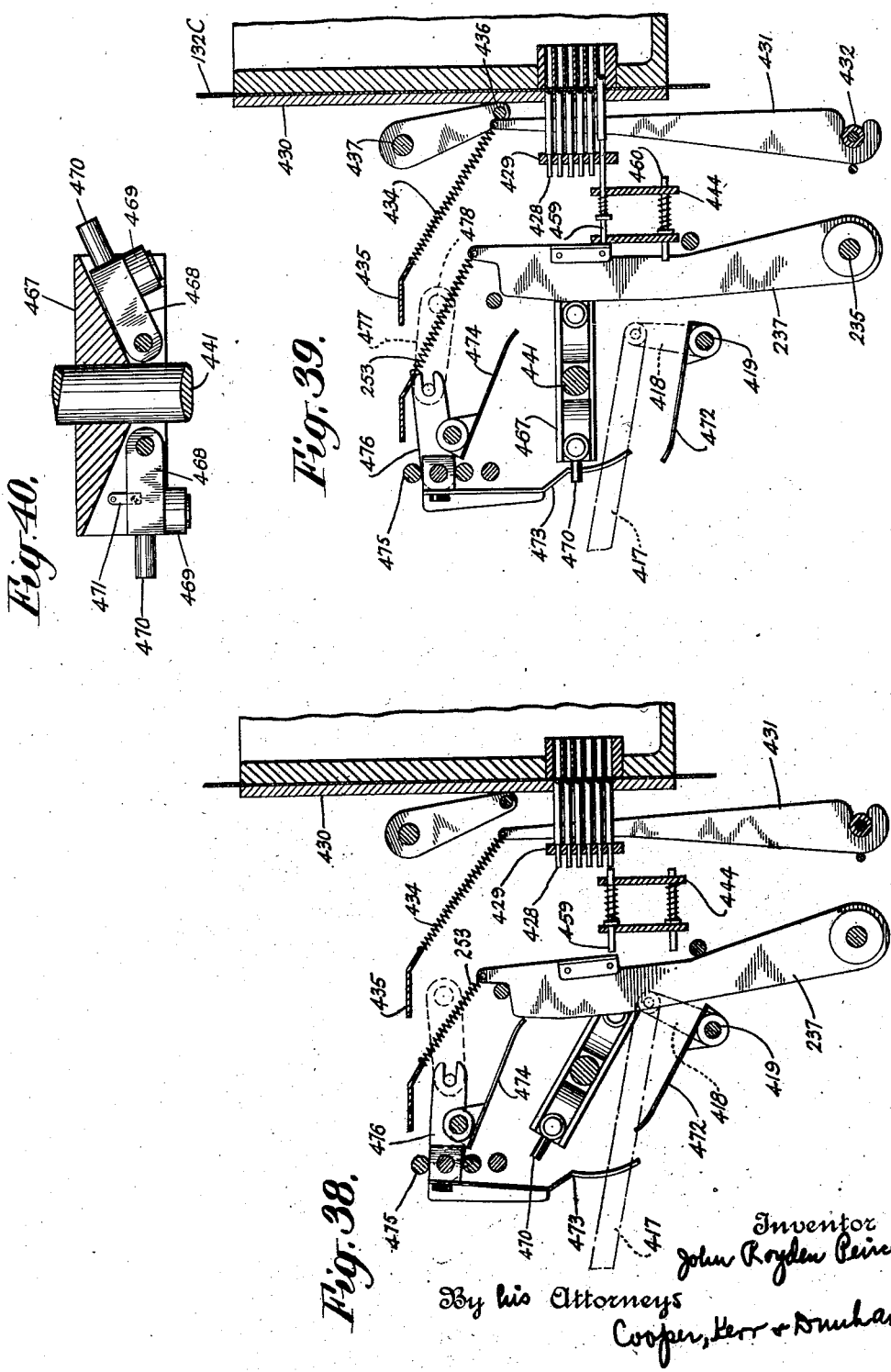

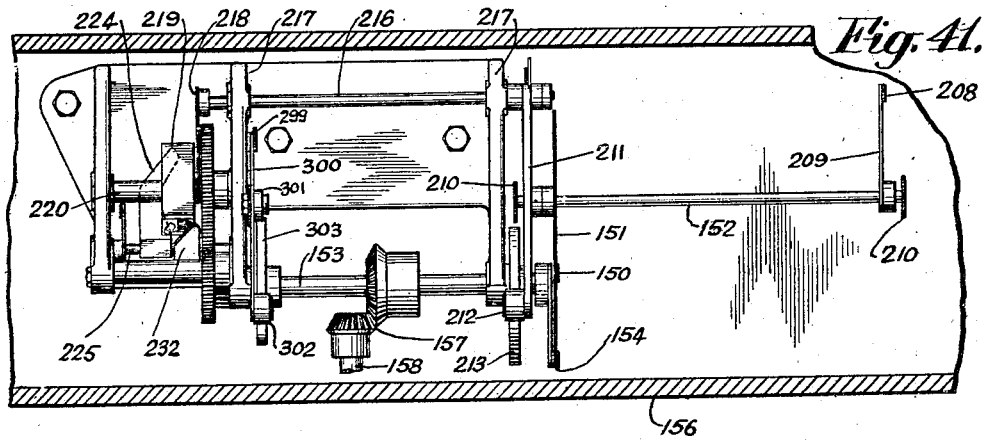
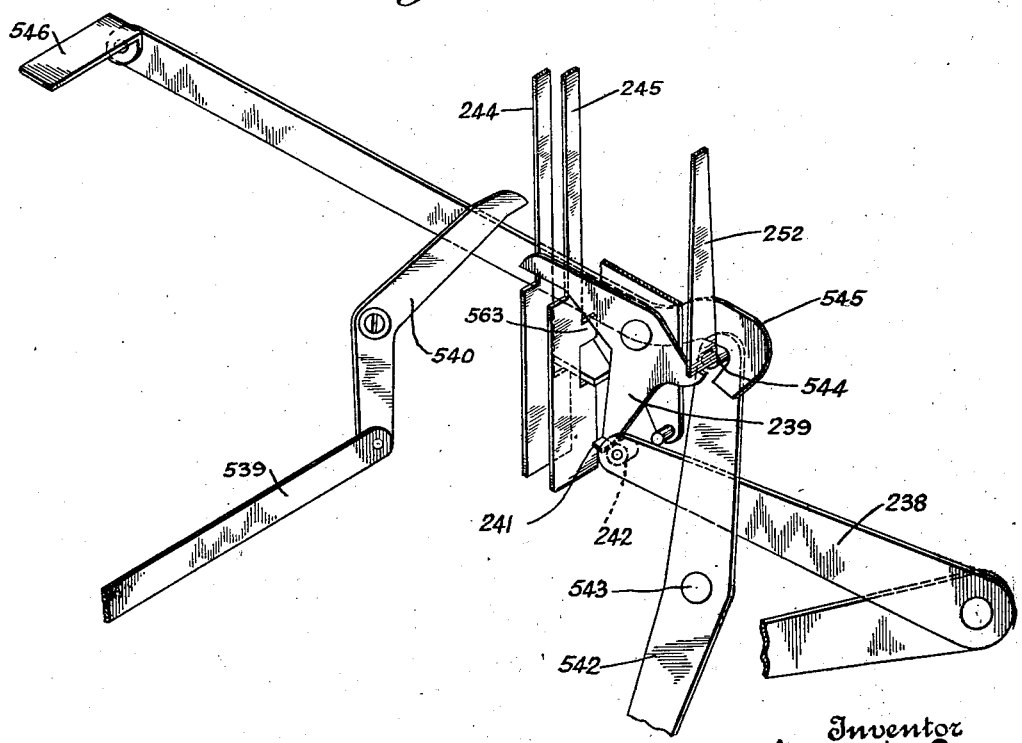

June 3, 1930.  J. R. PEIRCE  1,761,741
RECORD COMPARING AND POSTING MACHINE
Filed Jan. 8, 1923  28 Sheets-Sheet 26
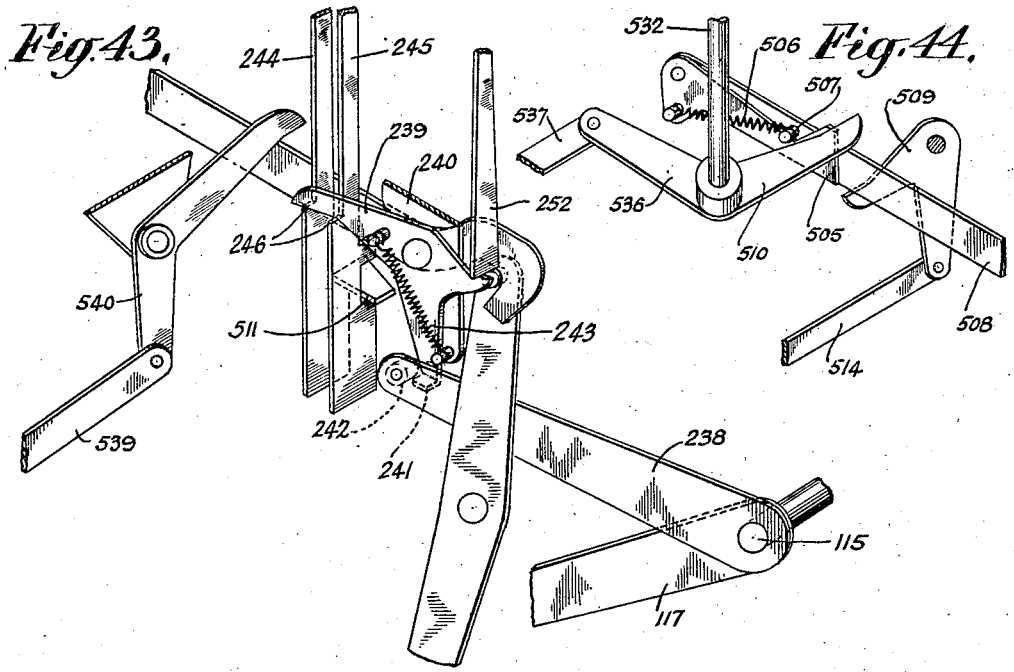
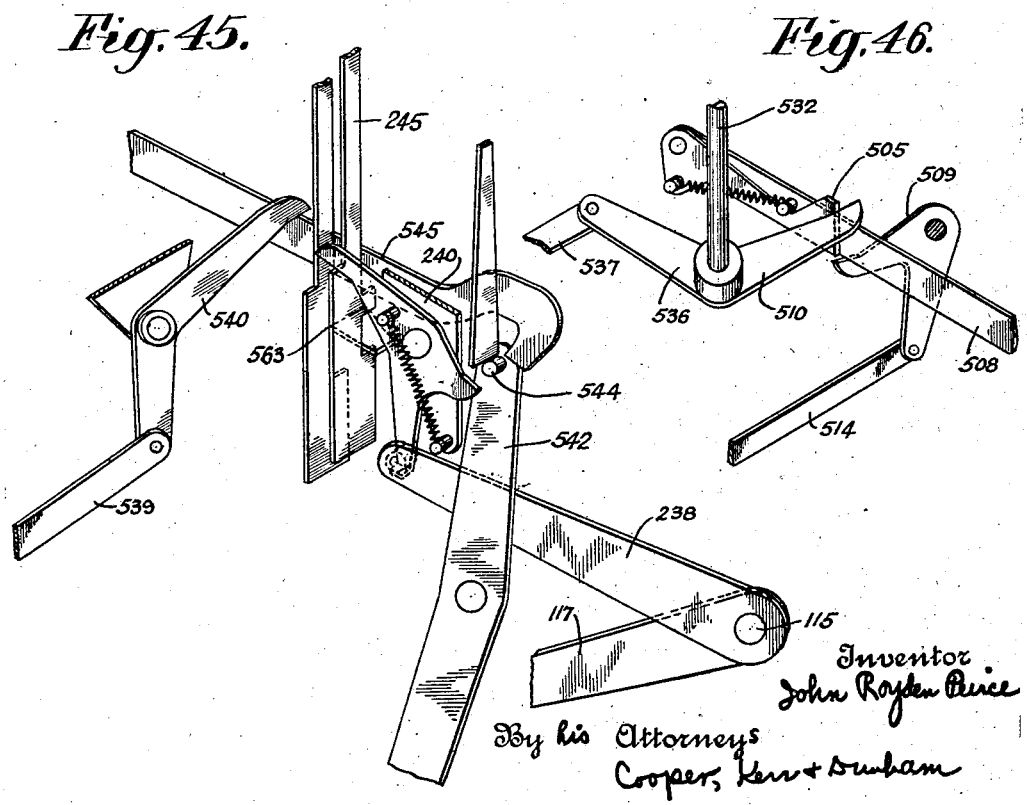

June 3, 1930.   J. R. PEIRCE   1,761,741
RECORD COMPARING AND POSTING MACHINE
Filed Jan. 8, 1923   28 Sheets-Sheet 27
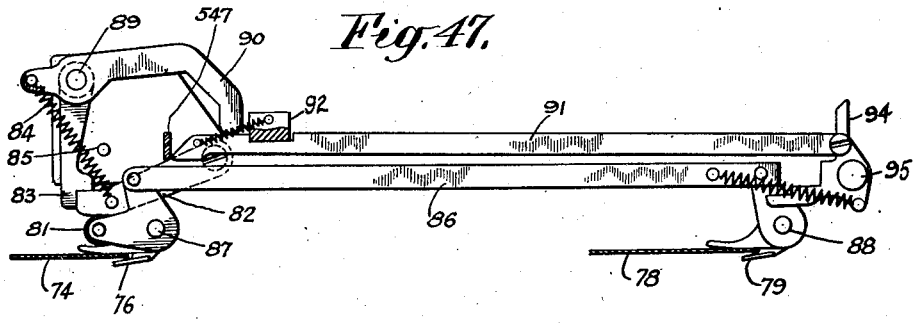
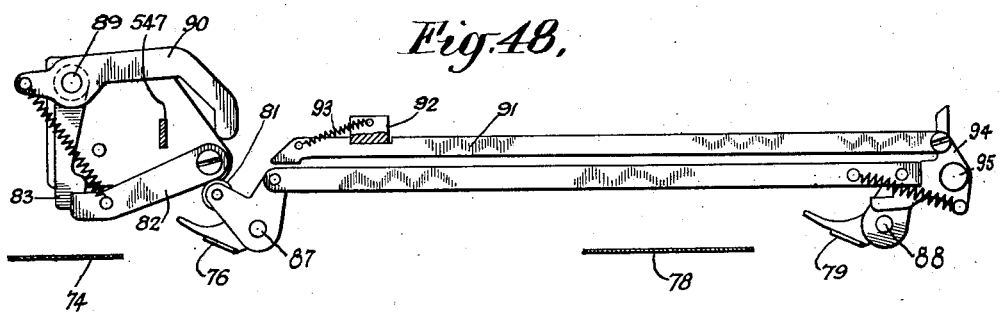
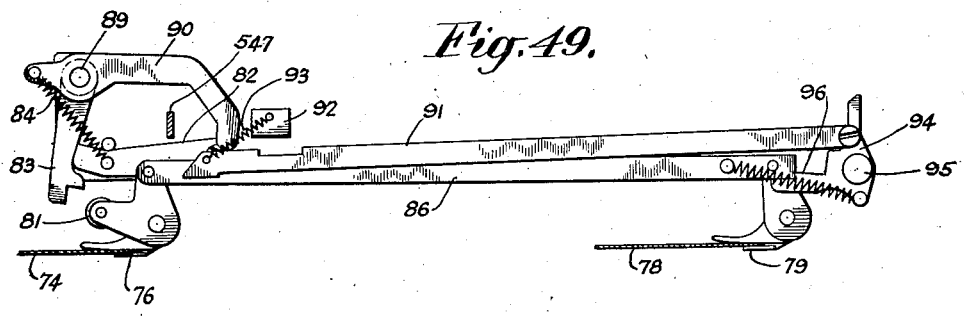
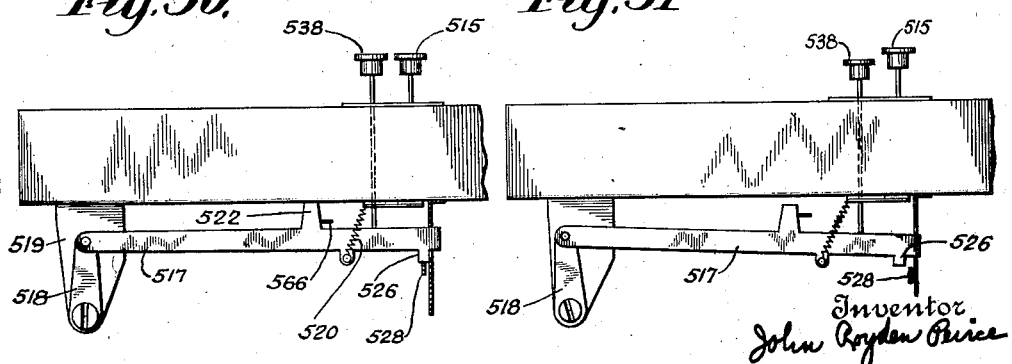

Patented June 3, 1930

1,761,741

UNITED STATES PATENT OFFICE

JOHN ROYDEN PEIRCE, OF NEW YORK, N. Y., ASSIGNOR TO INTERNATIONAL BUSINESS MACHINES CORPORATION, OF NEW YORK, N. Y., A CORPORATION OF NEW YORK

RECORD COMPARING AND POSTING MACHINE

Application filed January 8, 1923. Serial No. 611,491.

This invention relates to automatic posting machines, and has to do with that class of business machines which operate upon or are controlled by record sheets having index points or characters which taken either singly or combined represent definite items of information.

The object of the present invention is to devise a machine which will operate upon record sheets or cards; receiving information from other cards; identifying the record sheet to which the information belongs, and posting the information upon such sheet.

In the present embodiment of the invention the machine operates upon and is controlled by cards upon which data is recorded in the form of perforations arranged in combinations and fields as more specifically disclosed in my copending application, Serial No. 566,447, for improvements in method of and apparatus for perforating record sheets, filed June 7, 1922, now Patent No. 1,506,381, dated August 26, 1924.

To facilitate sight reading the data as disclosed in said application may also be printed on the card.

The machine acts upon the perforations; feeler pins acting as data sensing elements, being adapted to control the operation of other instrumentalities.

In my copending application, Serial No. 566,448, for improvements in record sheets and apparatus controlled thereby, filed June 7, 1922, now Patent No. 1,506,382, dated August 26, 1924, I disclosed an automatic notice writing machine designed to be controlled by master record cards. The machine there disclosed shows the application of the invention to the writing of insurance premium notices. The machine is controlled by a master card upon which is recorded the name of the policy holder and the usual items of information relating thereto including the periods at which the premiums are payable. At stated periods all of the master cards are placed in the notice writing machine and automatically fed there-through. Sensing elements adjusted to operate for a given period are then brought into action upon each card as it reaches a reading station. If a payment of premium is due for that period, the machine prints a notice to that effect to be sent to the policy holder. The notice card has attached thereto a stub or audit card which is returned to the office when the premium is paid.

The machine disclosing the present invention is designed to post upon the master card a record of the fact that a premium payable at a given time has been paid within that time. Thus, at the expiration of the due date, all of the master cards that were run through the notice writing machine are placed in the posting machine. The returned stubs or audit cards are also placed in the machine after being arranged in consecutive order according to the policy number. Both sets of cards are then automatically fed through the machine simultaneously. When the opposing master and audit cards reach a given point which we will call the comparing station, they are momentarily stopped and reading elements act upon each card to sense the policy numbers contained thereon and to ascertain whether the master card is active for the current period, that is, whether a premium is due for that period and a due notice has been sent to the policy holder. If the sensing elements ascertain from the master card that a premium is due and notice thereof has been sent, and if the policy numbers of master and stub are the same, the presence of the stub indicating that the premium has been paid, the stub is then carried to a file pocket and the master card is carried to a posting station, and instrumentalities are brought into operation to record upon the master the fact that the premium has been paid. After the posting operation the master card is carried to a master card file pocket. Should the reading elements ascertain that no premium is then payable, there will, of course, be no audit card comparing with that master since no notice will have been sent. The master card will then be fed directly to the file pocket, while the opposing stub will be retained at the comparing station pending the arrival there of the next master card. If payment is due, a notice has been sent but payment has not been made, the master card is transferred to a reject pocket for subsequent investigation and the opposing stub is held for comparison with the next master. If a master card is missing from the stack and the stub corresponding thereto is in the machine, the stub will be rejected and the opposing master held for the next stub. Numerous other conditions may arise requiring personal attention or investigation. In such instances the appropriate card is sent to the reject pocket. For instance, it may be that a previous premium was not paid and the lapsed condition indicated on the master. Should a subsequent notice be sent and premium paid, when the cards are run through the posting machine the lapsed condition will be sensed and the stub will be sent to the reject pocket.

While the machine herein illustrated and described is particularly adapted to post upon master insurance record sheets information taken from notice card stubs, it is to be understood that the machine and invention are not limited to this particular use but may be applied to many other uses where cards or other record sheets in a group or in several separate groups are to be compared for identity and items of information transferred from one to another.

Referring to the drawings wherein I have shown what I now consider to be the preferred form of my invention:

Fig. 2 shows a master card upon which is recorded various items of information in both printed characters and perforations, and upon which additional data is to be posted.

Fig. 3 is a portion of the master card perforated to indicate that premiums are payable annually in January.

Fig. 4 is a similar portion of the master card perforated to designate monthly payments.

Fig. 5 shows the stub or audit card after being detached from the notice card and which is to control the posting operation.

Fig. 6 is a diagrammatic view showing in part the sequence of operations performed by the machine.

Fig. 7 is a diagram showing the combinations of perforations used in the machine to represent the digits.

Fig. 8 is a plan view of the machine showing the several stations occupied by the master and stub cards during the successive steps in the operation of the machine, and the shuttle mechanisms for carrying the cards to these stations; parts of the machine being omitted for the sake of clearness.

Fig. 9 is an elevation as seen from the front of the machine, showing the mechanism for feeding the master card from station to station through the machine; other parts of the machine being omitted.

Fig. 10 is a similar view on a slightly larger scale and with the comparing and posting units in position.

Figure 16:
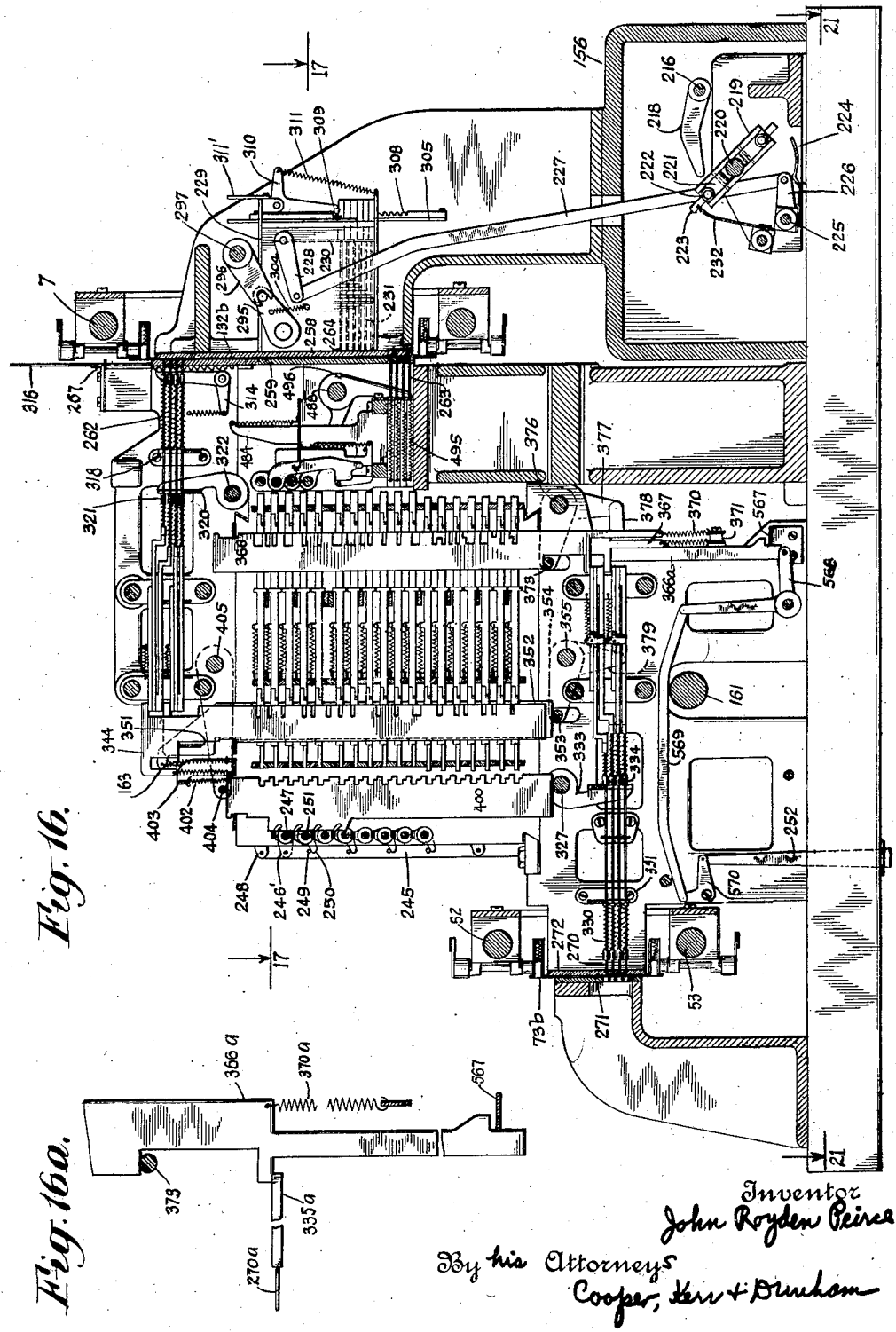
Fig. 16 is a section of the comparing unit taken on line 16—16 of Fig. 8.

Fig. 16$^a$ is a detail view of a comb.

Figure 17:
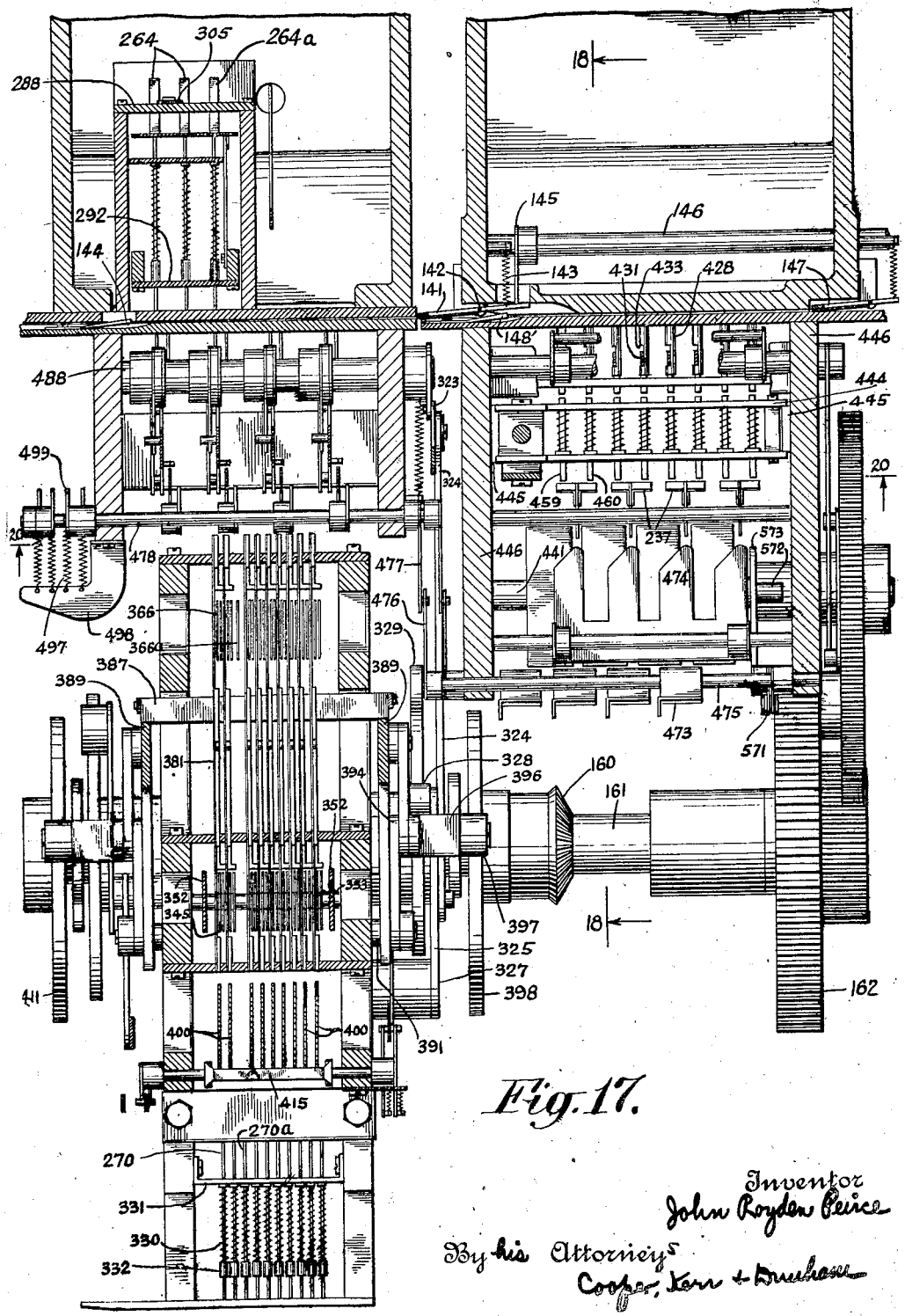

Fig. 17 is a sectional plan view of the comparing and posting units taken on line 17—17 of Fig. 16.

Fig. 18 is a sectional view of the posting unit taken on line 18—18 of Fig. 17.

Fig. 19 is a rear view of the bracket shown in Fig. 16 and shows means for adjusting the machine to operate for a particular month.

Fig. 20 is a section taken on line 20—20 of Fig. 17.

Fig. 20$^a$ is a diagrammatic representation of the operation of the comparing combs and bails.

Figure 21:
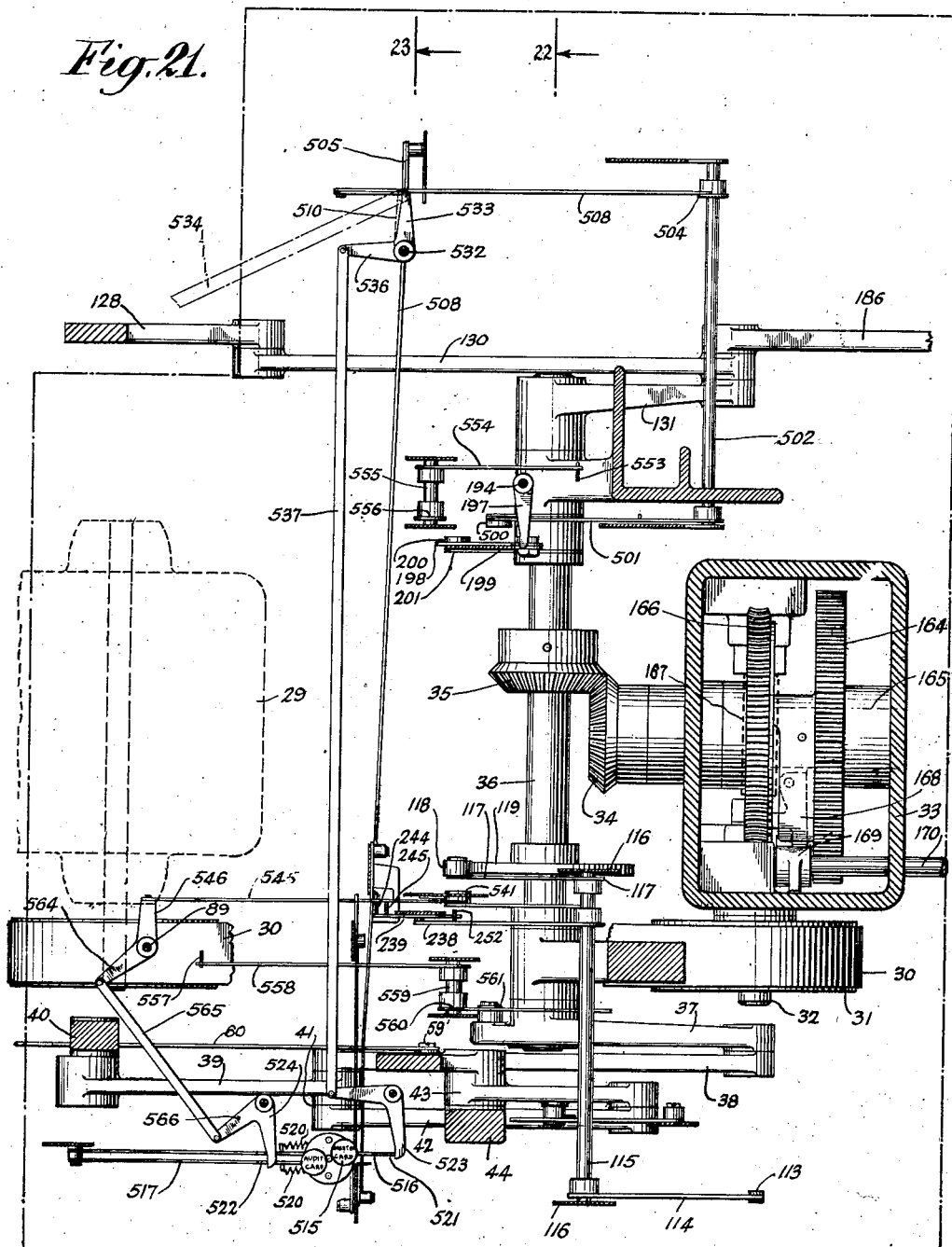

Fig. 21 is a sectional plan view of the mechanism contained in the lower part of the machine; the view being taken substantially on line 21—21 of Fig. 16.

Fig. 22 is a section of said mechanism taken on line 22—22 of Fig. 21.

Fig. 23 is a section taken on line 23—23 of Fig. 21.

Figure 24:
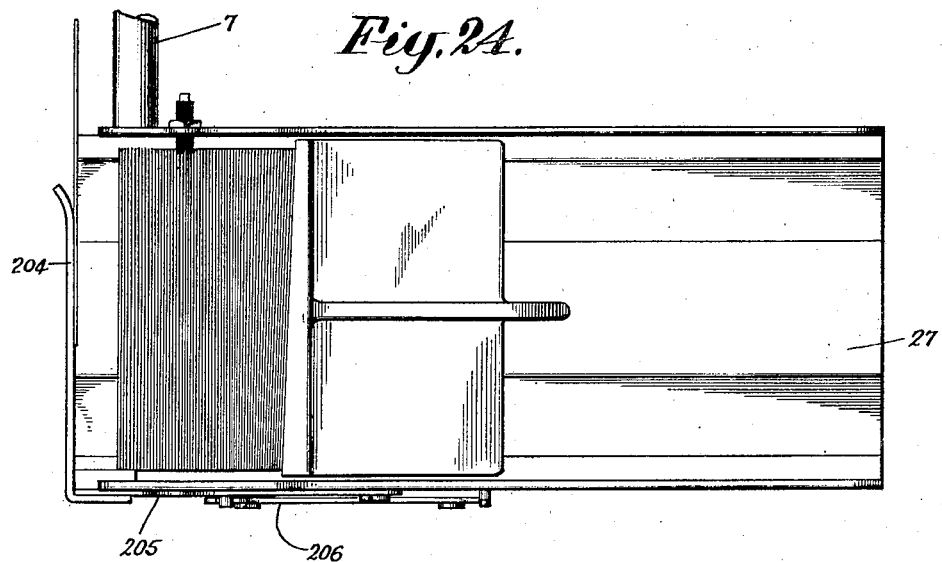

Fig. 24 is a plan view of the master card reject pocket; the parts being in position to intercept and receive a card.

Figure 25:
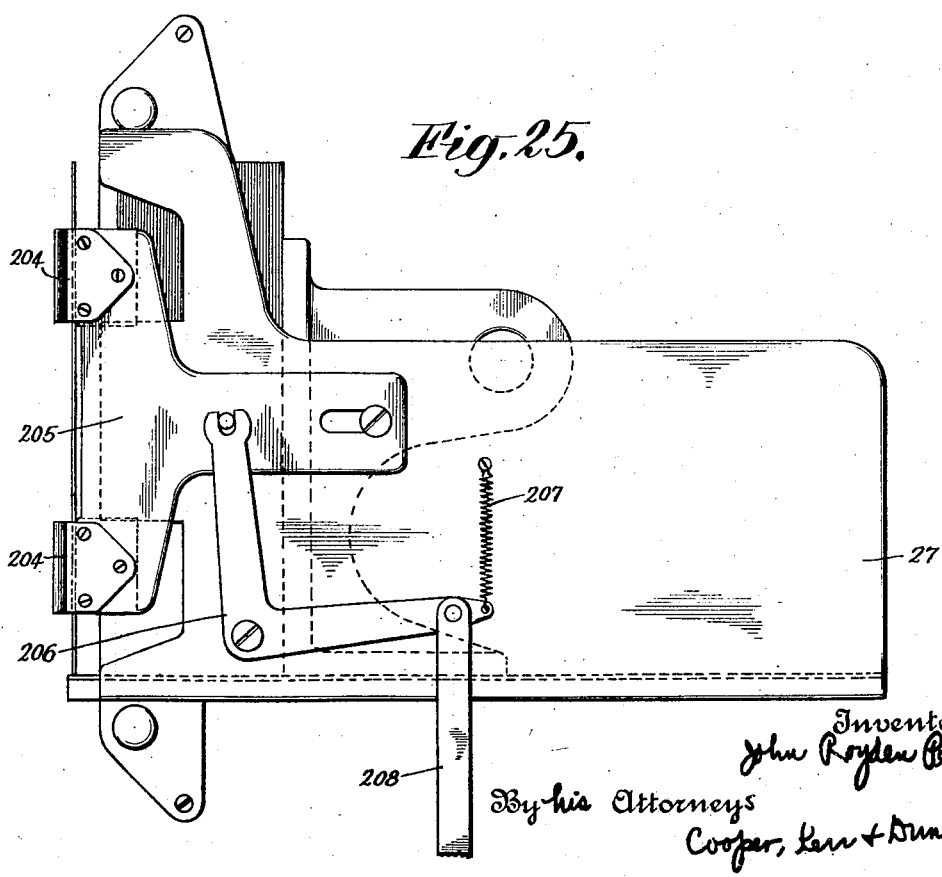

Fig. 25 is a side view of said pocket.

Fig. 26 is a section in elevation of the comparing unit only; the view being similar to Fig. 16, but on a larger scale and with adjacent parts omitted. The parts of the unit are shown in their normal positions.

Fig. 27 is a similar view with the parts in operative positions.

Fig. 28 is a perspective detail view showing a set of combination combs and feeler bars in normal position.

Fig. 29 is a similar view of the parts in operative positions.

Figs. 30 to 33 show diagrammatically how the feeler bars take readings from the combination combs and communicate the same to the comparing combs.

Fig. 34 is a detail sectional view of the yearly and monthly zone selector pins in normal position.

Fig. 35 is a view of the parts in operative position.

Figs. 36 and 37 are details of the card feed mechanism in normal and operative positions respectively.

Figs. 38 and 39 are detail sectional views of the posting unit in normal and operative positions respectively.

Fig. 40 is a detail of the punch-hammer actuating means shown in Figs. 38 and 39.

Fig. 41 is a plan view of certain driving mechanism contained in a case in the back of the machine.

Figs. 42 to 46 are detail perspective views of mechanism shown in Fig. 21, which is controlled by the condition of the cards and which in turn controls the feeding of the cards.

Figs. 47 to 49 are details of the card clip mechanism in different positions, showing how they are controlled by the conditions of the cards.

Figs. 50 and 51 are details of mechanism for manually controlling the feeding of the cards under certain conditions.

Figure 52:
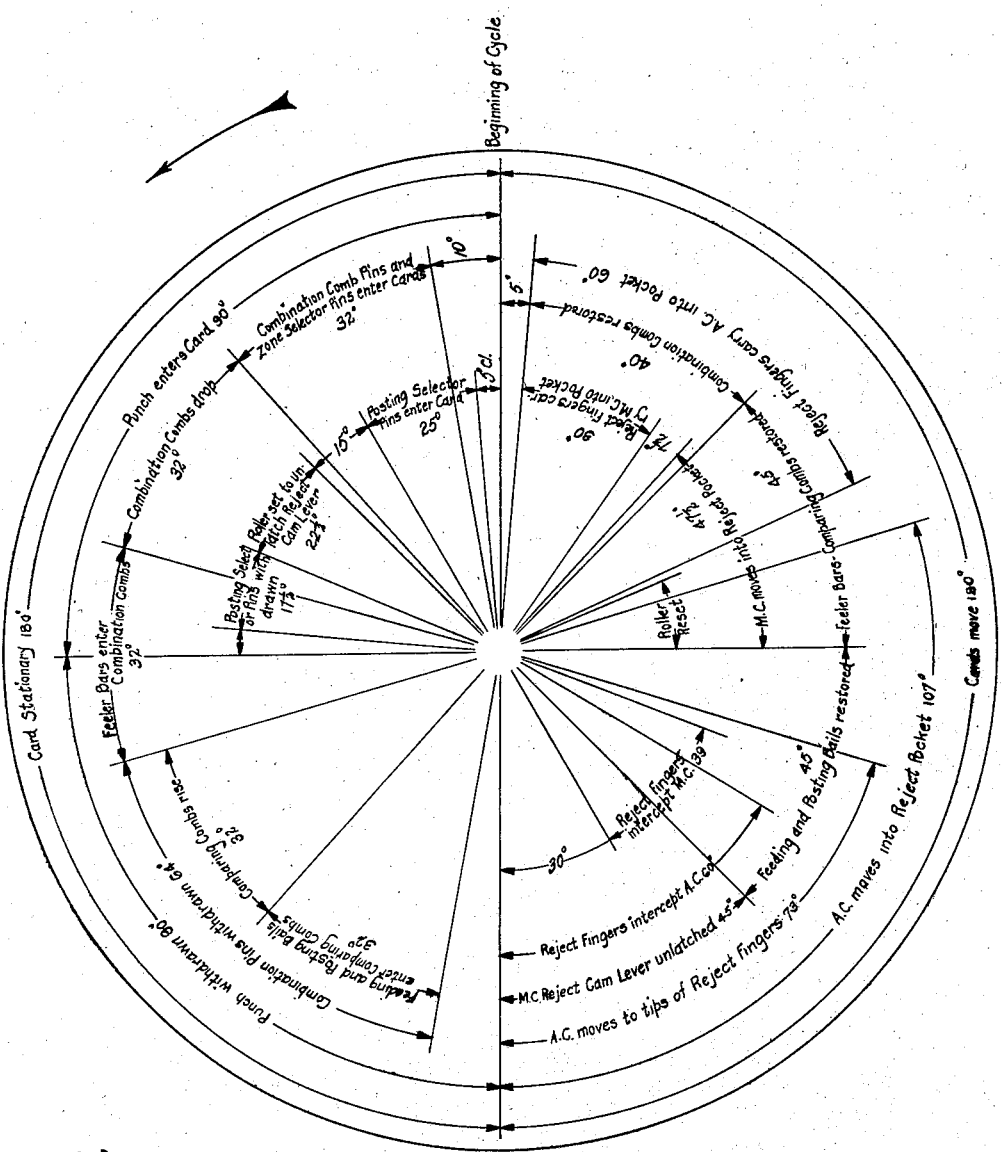

Fig. 52 is a timing diagram of the machine.

In Fig. 2 of the drawings I have shown the same master card 10 as is shown in my aforesaid application, Serial No. 566,448. This card it will be recalled is divided into several fields containing printed matter relating to an insurance policy and could, of course, relate to any subject. Corresponding to each printed field is a perforated field in which holes are punched through the card in such combinational arrangements as to represent the same information as is contained in the printed fields. Thus in field 11, which is subdivided into several smaller fields, figures are printed, such as 3, 1, 21, representing the date of issue of the policy. In the field 12 are the perforations representing the same figures; the perforations being arranged in vertical rows directly beneath the digits which they represent according to the combination table shown in Fig. 7. The name of the insured is printed in field 13 and perforated in field 14.

In the lower portion of the card arranged transversely are shown four fields 15, 16, 17 and 18. Each of these fields as shown in their lower left hand corners 19 represents a different year, and is divided into spaces representing the months of the year. To indicate that the premiums are payable annually and in the month of January, a hole may be punched at January in field 15 as shown at 20, Fig. 3. A hole at this point will moreover serve for all of the succeeding years on the card. To indicate quarterly payments in January, April, July and October, these four months will be perforated as in Fig. 2. Instead of punching twelve holes when payments are to be made monthly, a single hole punched through January of the second year zone 16 as shown at 21 in Fig. 4 may be employed.

According to the aforesaid application, No. 566,448 all of the master cards may be run through the notice writing machine once a month. If there is a hole at 21 in zone 16 a notice will be printed. If there is no hole there but zone 15 is punched for the current month a notice will be printed. Whenever a notice is made out this fact is indicated upon the master card. This is shown in Fig. 2. When the card is put through the machine for January notices, and the notice is written, the notice writing machine punches a hole 22 in the first hole space following the month of January. When the April notice is sent a hole 23 is punched, etc.

After payment of the January premium has been made, the stub 24, Fig. 5, having been detached from the notice card is run through the posting machine along with the master card, and the machine matching the cards, will punch the hole 25 in the second hole space following the month of January.

Figure 1:
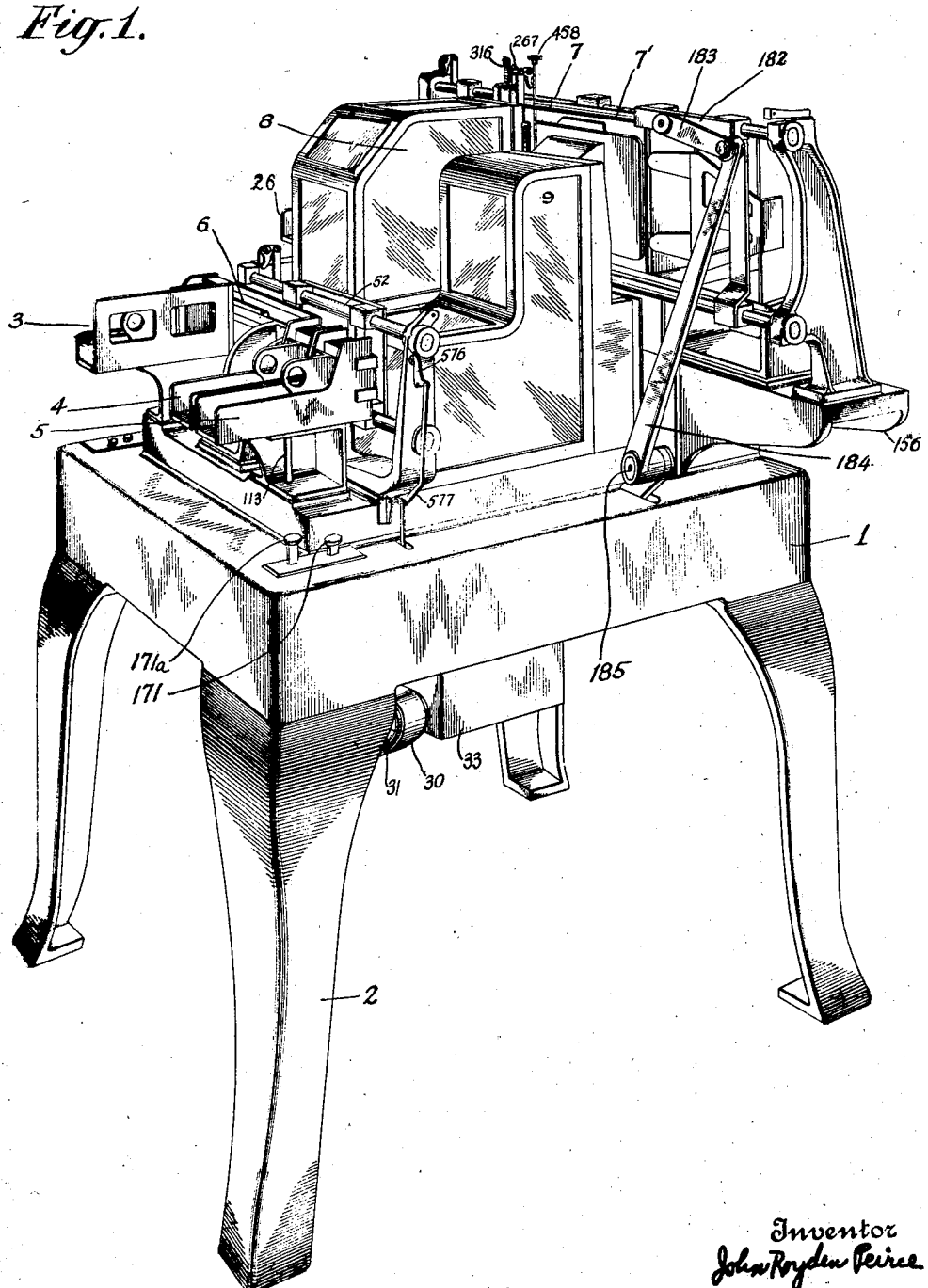
Fig. 1 is a perspective view of the complete machine.

In Fig. 1 the base 1 of the machine is shown mounted on legs 2. Above the base and in the front part of the machine is shown the audit card magazine 3 and the reject and file pockets 4 and 5 and also part of the shuttle 6 for carrying the card to its successive stations. The corresponding elements for the master card are disposed along the back of the machine, the shuttle guide rods being shown at 7 and 7'. Between these two portions are located the comparing and posting units within casings 8 and 9 respectively.

In Fig. 8 the master card magazine is shown at 26, and the reject and file pockets at 27, 28 respectively.

We will now consider the mechanism by which the cards are taken from their magazines and fed to their successive stations, after which we will consider the means for reading and comparing the cards and for effecting the posting operation, as well as the manner in which the latter elements control the feeding mechanism.

Figure 13:
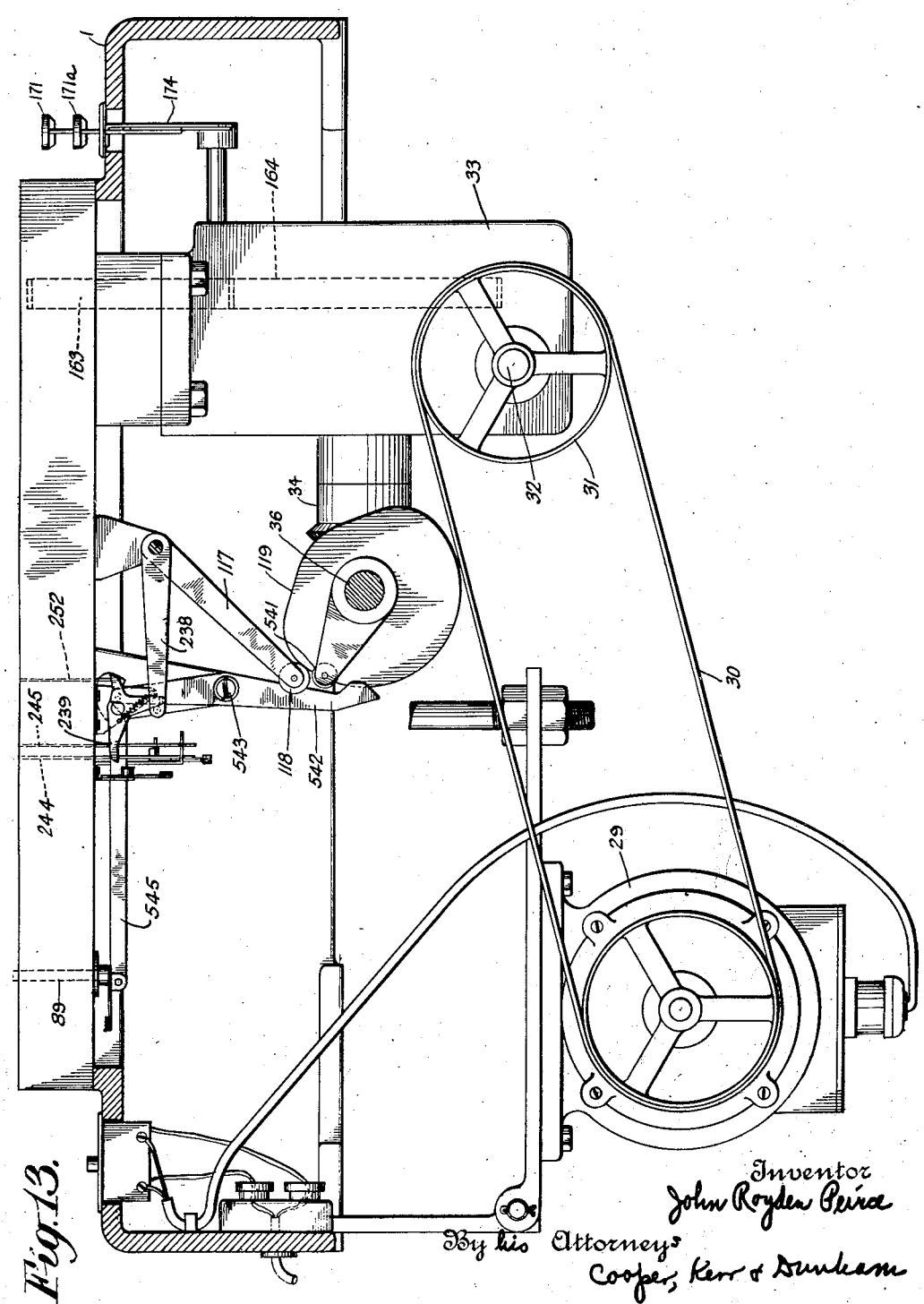
Fig. 13 is a sectional front elevation of the lower part of the machine, being in part a downward continuation of Fig. 10 and shows the driving mechanism.

The driving motor is shown at 29, Figs. 13 and 21, and is connected by a belt 30 to a pulley wheel 31 on a shaft 32. Loosely mounted on a shaft 165 in the box is a worm gear 166 meshing with a worm 167 on the shaft 32. Fixedly attached to a gear 164, which is fixed on a shaft 165, is a clutch member 168 adapted to normally lock the gear 164 to the worm 166. A member 169 actuated through shaft 170 is adapted to throw the clutch member out of engagement with the worm. The clutch mechanism is clearly shown in my aforesaid application, No. 566,448. Thus, when the motor 29 is running, if the clutch is out the worm wheel 166 will turn loosely on its shaft, but if the clutch is in the shaft 165 will be caused to rotate with gear 164 and bevel gear 34 also fixed on shaft 165.

Figure 14:
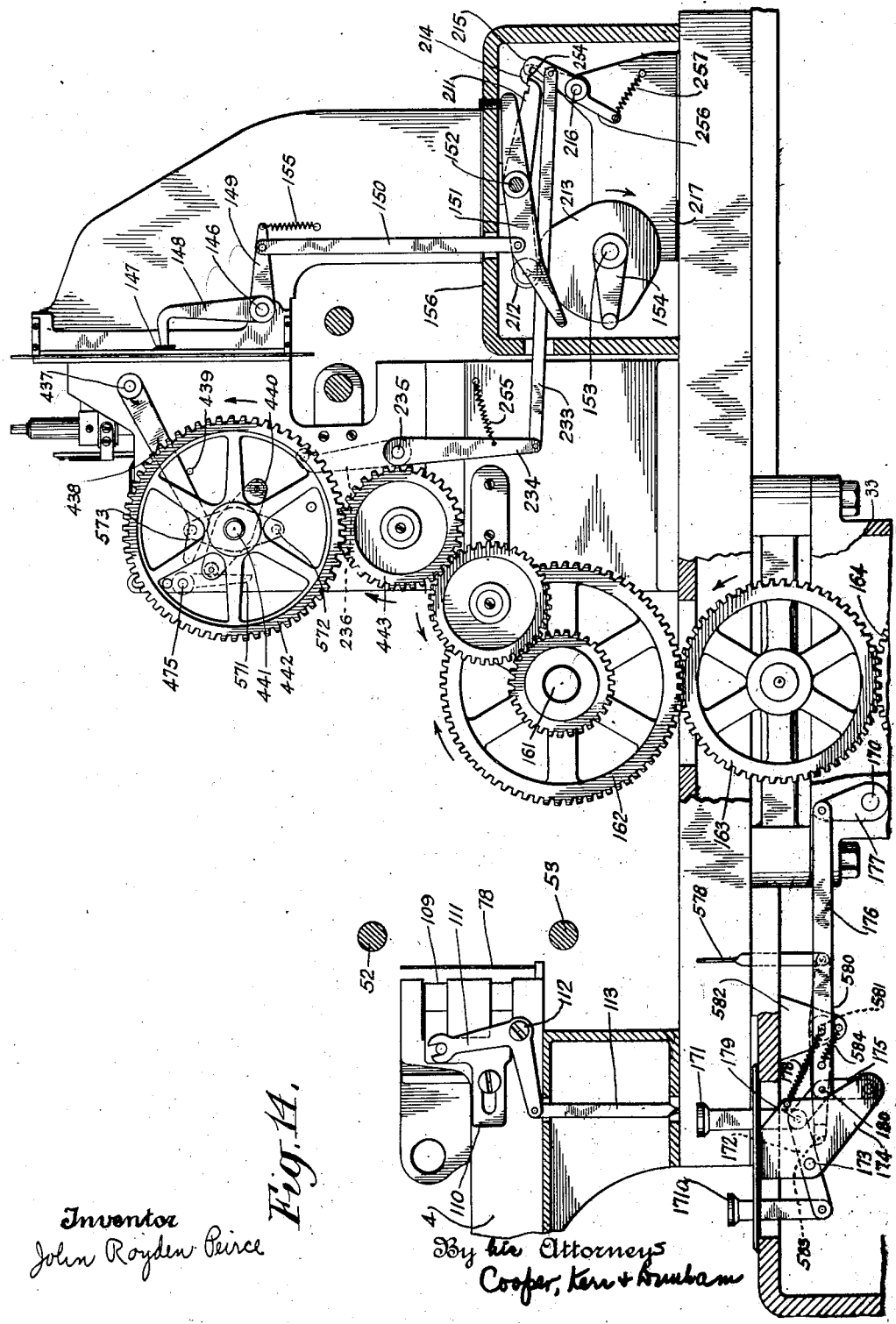
Fig. 14 is a section taken substantially on line 14—14 of Fig. 8, showing transmission and control elements.

The actuation of the clutch may be effected by means of push buttons, or keys, 171ª, 171, Fig. 14. These keys are connected to opposite ends of a lever 172 pivotally attached at 173 to a fixed bracket 174. The lever is connected to one end of a toggle 175, the other end of which is connected to the bracket 174. The middle of the toggle is connected by a link 176 to a crank 177 on the clutch shaft 170. When key 171ª is in the depressed position shown the toggle tends to straighten out, pulling link 176 to the left and turning shaft 170 counter-clockwise. This disengages the clutch. When key 171 is depressed, link 176 will move to the right rotating shaft 170 clockwise and the clutch will become engaged. A spring 178 connected to link 176 and bracket 174 may serve to hold link 176 in its left hand position, and when key 171 is down, the joint 179 being slightly below joint 180, the parts will be held in such position. Thus spring 178 will maintain the clutch in the position in which it is set. The bevel gear 34 meshes with a bevel gear 35 fixed on a shaft 36. On the forward end of this shaft is fixed a crank 37, Figs. 11 and 21, pivotally connected at one end to a link 38 which is pivoted at its other end to an idling lever 39 which is in turn pivoted at 40 to a fixed part of the machine. Attached to link 38 and lever 39 at 41 is a link 42 connected to a lever 43 pivoted near its middle to a fixed element 44. The upper end 45 of lever 43 is pivoted to a link 46 which is in turn pivotally attached at 47 to the audit card feeding carriage or shuttle 59. The main frame of said shuttle comprises four bearing blocks 48, 49, 50, 51 secured together by a plate 58 and slidably mounted on two guide rods 52, 53 which are fixed at their ends in bosses 54, 55 forming parts of fixed brackets 56, 57. It will now be seen that when the shaft 36 rotates the links 38, 42 will be caused to reciprocate, and his will cause oscillation of lever 43 about its fulcrum 44. This in turn will, through link 46, cause the shuttle 59 to move back and forth on the guide rods 52, 53. Also pivoted to lever 43, at a point 59', slightly above its fulcrum, is a link 60 connected to a lever 61 fulcrumed at 62 and having an upwardly projecting arm 63. Said arm rests against a pin 64, see also Figs. 36 and 37, fixed in the feeding cross head member 65. This member is slidably mounted on a fixed rod 66 and is provided with an arm 67 sliding in a fixed grooved member 68. A tension spring 69 attached at one end to a peg 70 in the rod 67 and at the other to a peg 71 in member 68, serves to resiliently hold the cross head 65 in the position shown in Fig. 36; the pin 64 resting against the lever arm 63 and the card picker 72 resting off the edge of the cards 73. The rocking of the lever 43 counter-clockwise will, through link 60, rock lever 61 clockwise and by the action of the upper arm 63 against the pin 64, force cross head 65 forward against the action of spring 69 as indicated in Fig. 37. The picker 72 will then, in the well known manner, advance the first card of the stack 73 to the forward position 73ª as shown, ready to be engaged by the card clips.

Figure 11:
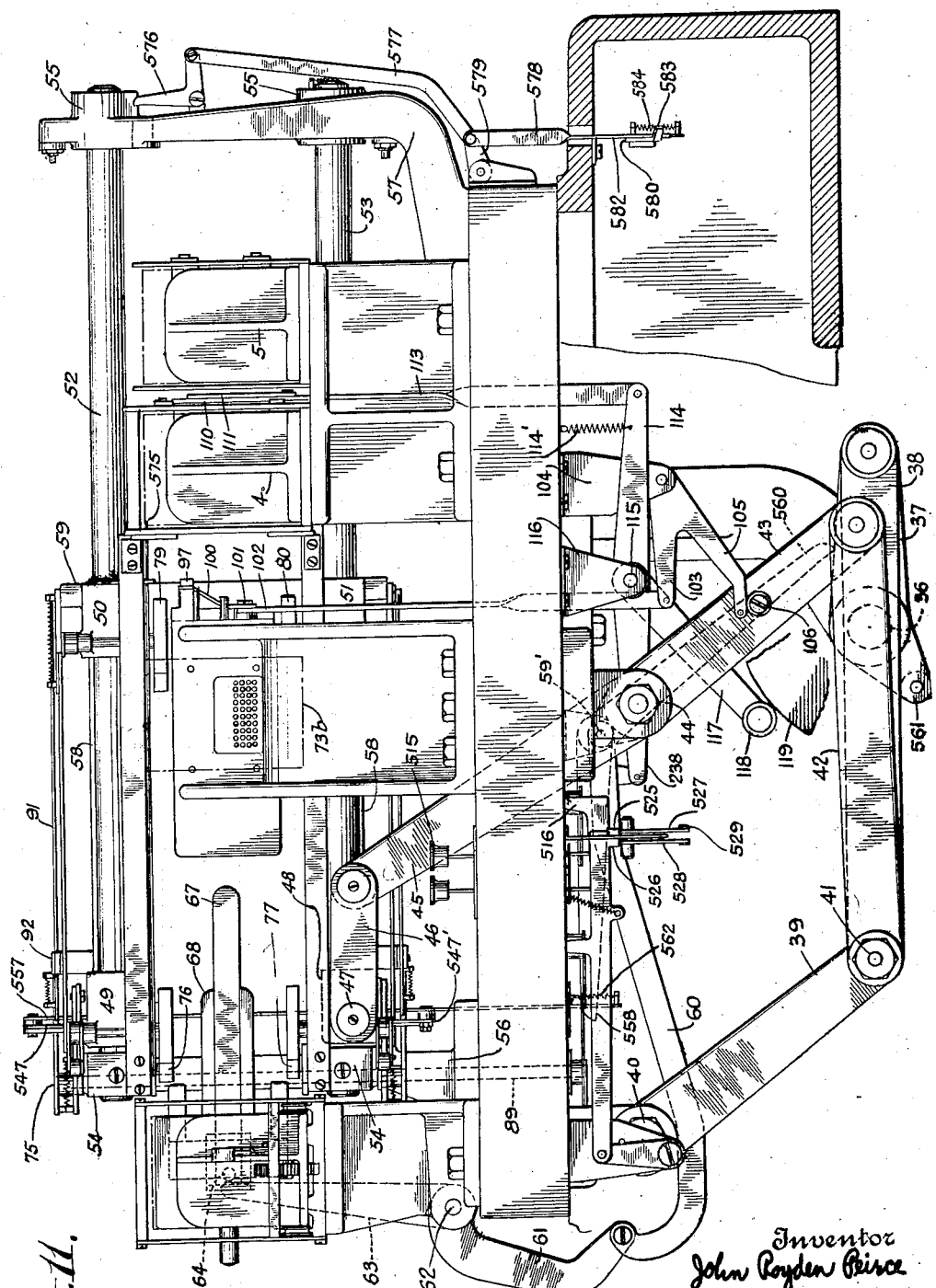
Fig. 11 is a view similar to Fig. 9 of the audit card feeding mechanism on a larger scale.

The card clip mechanism 75, Figs. 8 and 11, is carried by the members 48, 49, 50, 51 of the card shuttle which we have heretofore considered, and are carried back and forth by the shuttle. The audit card shuttle carries two sets of card clips; a forward set having upper and lower clips 76, 77 adapted to take the card from the position to which the picker 72 has advanced it and to carry it to the comparing position indicated by dotted line 73ᵇ, Fig. 11, and a second set having upper and lower clips 79, 80 adapted to take the card from the comparing position and carry it to the reject or file pockets 4, 5. One of the clips of each set is shown in plan in each of the Figs. 47, 48 and 49; these views showing the clips in different positions and showing how they are connected together to operate simultaneously. The manner in which the clips open and close is shown in greater detail in my aforesaid application, No. 566,448. In that case it was seen that when the roller 81 rolls up the inclined lever 82 as the clip 76 moves toward the card 74, Fig. 48, the clip will open and straddle the card as in Fig. 74. If at this point the latch 83 releases the lever 82 and spring 84 removes the same to the inactive position against a stop 85, the clip will close over the card as in Fig. 49, and on the return stroke carry the card with it. If the lever 82 is not unlatched, however, the clip will not close over the card, but will move away from it in the open position, closing gradually as the roller 81 reaches the end of the inclined lever 82 as in Fig. 48.

The clip 76 is connected to the clip 79 by a link 86 in such a manner that the movements of clip 76 about its axis 87 are reproduced in clip 79 about its axis 88. Thus, the opening and closing of one of the clips will be accompanied by the same movements in the other; and when one clip grips and advances a card, the other will do likewise.

The latch 83 which holds the inclined lever 82 in position is fixed on a shaft 89 reaching down into the base of the machine and is adapted to be controlled by the condition of the card in a manner to be considered later. Rotation of said shaft clockwise will release lever 82 and permit it to assume the position shown in Fig. 49. At the same time, a lever 90 also fixed on shaft 89 will press a link 91 out of locked engagement with a member 92 also on the car clip carriage, see also Fig. 11. The spring 93 will then cause link 91 to move to the right with respect to member 92, as shown in Fig. 49, causing a bell crank 94 to turn about its axis 95 and thrust a shoulder 96 into the path of the link 86. This will prevent the clips from turning out of the path of the card about their axes 87, 88 when the roller 81 is disengaged, so that the clips although closing will remain in the positions shown in Fig. 49 while advancing with cards. At the end of the stroke of the carriage the bell crank 94 will strike a fixed pin 94″, Fig. 8, causing it to rotate and move arm 91 to the left, restoring the arm to locked engagement with member 92. This in turn will permit the clips to turn out of the path of the cards for the return stroke.

Figure 12:
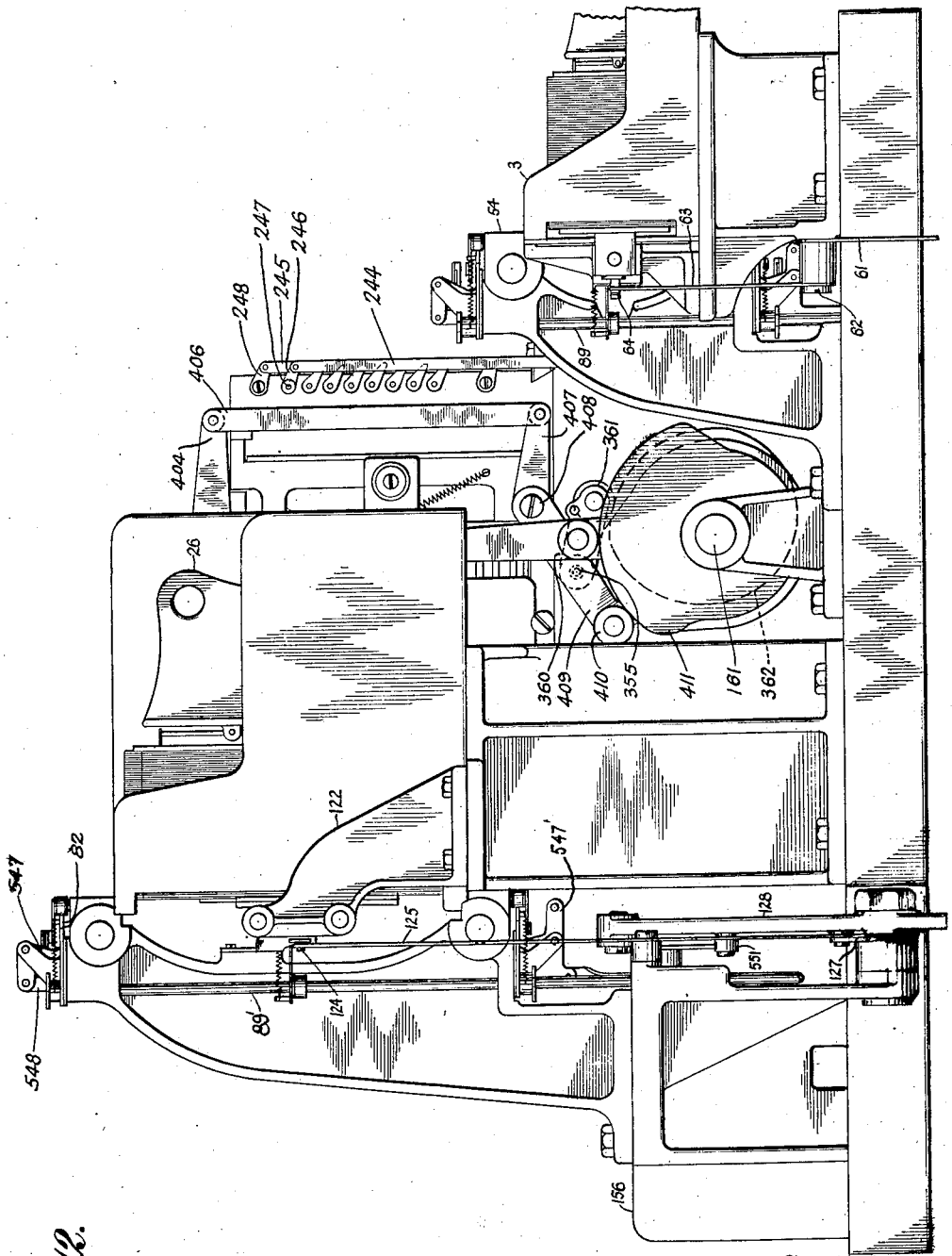
Fig. 12 is an end elevation of the upper portion of the machine looking from the left in Fig. 8.

The inclined member 82 is restored to its operative position as in Figs. 47, 48 in the following manner: In the case of the clips 134, 135 for taking the master card from the file and from the comparing position, a bell crank 547, Fig. 12, is adapted to engage the member 82 as shown in Fig. 49. The bell crank is provided with a link 548 which as seen in Fig. 10 reaches down and is fastened to a lever 549. A bell crank 547′ is also attached to the link 548 to restore the lower clips of this set. The lever 549 is held in normal position by a spring 550 and maintains the bell crank 547 in the position shown in Fig. 48, away from the inclined member. When the member is unlatched it engages the bell crank. The free end of the lever 549 is in the path of a pin 551 on the shuttle-actuating arm 128 and is thus struck thereby at the end of each card feeding stroke of the shuttle. This tilts the lever and actuates the bell crank 547 to move the inclined member to normal position as in Fig. 47. The spring 84 now serves to turn shaft 89, moving latch 83 to locking position and lever 90 to inoperative position.

The inclined member 191, Fig. 8, associated with the clips 181 which take the master card from the posting position to the pockets is restored by a bell crank 552 having a depending link 553 connected to a lever 554, Figs. 9, 21 and 23, mounted on a shaft 555. Said shaft also carries a depending lever 556 adapted to be engaged and actuated by the cam 500.

The bell cranks 547 for restoring the inclined members 82 for the audit card clips is provided with a depending link 557, Figs. 11 and 21, connected to a lever 558 on a shaft 559. Another lever 560 on said shaft is adapted to be engaged and actuated by a cam roller 561 on the rear end of the crank 37. A spring 562 pulling upwardly on the link 557 serves to hold the parts in normal positions. Once each revolution of shaft 36, the cam 561 engages lever 560 and pulls down upon link 557 and thus restores the inclined members 82 and associated parts to their normal positions.

After a card has been started from the stack by the picker and then carried on by the card clips it is stripped from the clips by a stop 97 which is normally advanced by a spring 98 into the path of the card. The leading edge of the card strikes the stop while the clips continuing slip off from the card. The card is then in position at the comparing station. Back of the card stop 97 is a lever 99 which together with an arm 100 forms a bell crank pivoted at 101, see also Figs. 11 and 15, and connected at its outer end to a link 102. Said link reaches down into the base of the machine and connects to a lever 103 which is pivoted to a fixed bracket 104. A projecting arm 105 on said lever is adapted to be engaged by a roller 106 on the lever 43. Each time the lower part of the lever 43 moves to the right the roller will engage arm 105 and raise the rod 102 slightly, turning the bell crank 100 about its axis 101 and moving the card stop out of the path of the card. The structure of the card stop is similar to that of the master card stop which is shown in greater detail and which will be described presently.

While the stop is thus removed from the path of the card, the second set of clips 79, 80 grip it in the manner already described and carry it toward the pockets. Ordinarily the card will be carried past the reject pocket 4 to the file pocket 5; its normal path carrying it inside of the front plate 107 of the pocket so that when the card strikes the farther side 108 it will be stripped from the clips.

The front plate 109 of the reject pocket is carried by a member 110 slidably mounted on the side of the pocket as seen in Fig. 14. Member 110 is connected to a bell crank 111 pivoted at 112 on the pocket and connected through its other arm to a link 113 reaching down into the base of the machine, Figs. 11 and 21, where it is attached to a lever 114. Said lever is fixed on a shaft 115 supported by brackets 116. At the rear end of the shaft is fixed a lever 117 inclined downwardly as seen in Fig. 11 and provided with a roller 118 adapted to cooperate with a cam 119 on the main drive shaft 36. The cam action upon lever 117 in conjunction with spring 114′ serves to oscillate shaft 115 and causes an up and down reciprocation of link 113. This as seen in Fig. 14 rocks the bell crank 111 sliding member 110 back and forth. In its forward position the front portion of fingers 109 of the pocket will be beyond the card 78 so that the card will pass into the pocket and be stripped from the clips. The timing of the movements is such that normally the fingers 109 will be in the forward position to intercept the card when the latter is passing the reject pocket. To permit the cards to pass on to the file pocket means are provided to prevent the normal forward movement of the fingers. To this end a lever 238 is fixed on shaft 115. Adjacent the end of this lever, Fig. 43, is a bell crank 239 pivoted on a bracket 240 and provided with a projection 241 adapted to engage a pin 242 on the lever to lock the latter in its upper position; it being understood that when the cam 119 rocks shaft 115 the lever 238 will also move up and down. A spring 243 attached to the bell crank and the bracket 240 holds the projection 241 normally out of the path of the pin 242. Two bars 244, 245 provided with shoulders 246 are adapted to engage the rear end of the bell crank. These bars reach upwardly as shown in Figs. 10, 12 and 16. The bar 244 is connected through a lever 246' to a rod 247 so that rotation of the rod about its longitudinal axis will raise the bar. The other bar 245 is connected to an idling lever 248 and is provided with pins 249 adapted to be engaged by a plurality of levers 250 on rotatable rods 251. Rotation of any one of these rods will raise bar 245. The rotation of the rods 247, 251 is controlled by the cards in a manner presently to be considered, and the raising of either bar 244, 245 will tilt the bell crank 239 and lock the lever 238 in its raised position. This in turn will prevent the reject pocket fingers from intercepting the card and the latter will pass on to the file pocket.

There are instances when one of the bars 244, 245 will be raised to cause the card to be sent to the file pocket, but when by reason of some other condition the audit card should go to the reject pocket. Such conditions may be caused to control the disposition of the card by the depression of a member 252 adapted to engage the bell crank 239 and move the projection 241 to the opposite side of pins 242. Thus, when either of bars 244, 245 moves said projection into the path of the pin, member 252 if brought into operation will move it out of said path.

The master card feeding mechanism is similar to that of the audit card. The card picker is shown at 120, Figs. 8, 9, 10, slidably mounted on guide rods 121 fixed in a bracket 122. The picker has attached to it an arm 123 having a pin and roller 124 resting against a lever 125. A spring 126' attached to the arm at 127' and to a fixed pin 128' holds the roller 124 against the lever 125 and moves the picker to normal position when the lever moves to the left. The lever 125 is pivoted at 126 and is connected by a link 127 to a second lever 128 pivoted at 129. The latter lever is connected by a connecting rod 130 to a crank 131, see also Fig. 21, on the shaft 36. Rotation of said shaft will thus cause lever 125 to oscillate, moving the picker forward at each right hand stroke to feed a card from the dotted line position 132 to position 132$^a$ ready for the card clips to receive it.

Two sets of card clips 134, 135 are mounted on a carriage 136 slidably mounted on guide rods 7. A downwardly projecting arm 138 of the carriage is connected by a link 139 to the lever 128, so that the oscillation of the lever will slide the carriage back and forth on its guide rods. The clips 134 will grip the card at position 132$^a$ and carry it to the position 132$^b$ which is the comparing position. The card is stopped in this position and stripped from the clips by a card stop 141, Fig. 17, pivoted at 142 and moved to operative position by a spring 143. A resilient latch 144 over which the card passes is adapted to slip over the rear edge of the card when the latter reaches its position, to prevent it from moving backward. At the proper time in the cycle of the machine the stop 141 is removed from the path of the card so that it may move on. The clips 135 then grip the card and carry it to the dotted line position 132$^c$, Fig. 9; the card being stripped from the clips by a stop 147 and held against backward movement by a latch 148'. The removal of stops 141 and 147 from the path of the cards is effected by levers 145, 148, Figs. 17 and 14. Said levers are fixed on a shaft 146 on which is fixed a lever 149 connected by a link 150 to a lever 151 loosely mounted on a shaft 152. The latter lever is engaged once each revolution of a shaft 153 by a cam 154 carried thereby. The cam thus raises link 150 and rocks shaft 146, pressing levers 145, 148 against stops 141, 147 causing them to turn on their pivots 142. A spring 155 serves to hold levers 145, 148 nomally out of engagement with the stops.

The shaft 153 which is contained in a casing 156 (see also Figs. 18 and 41) receives its power through bevel gears 157, shaft 158 and bevel gears 159, 160, the latter gear being fixed on an upper drive shaft 161 which in turn, receives its power through a gear 162, Figs. 10 and 14, fixed thereon and meshing with an idler 163 which meshes with the gear 164, Figs. 13 and 21, fixed on the shaft 165 as we have heretofore seen in the clutch box 33.

The master card is taken from the posting position 132$^c$ by a set of clips 181 on a carriage 182 slidably mounted on fixed guide rods 7'. The carriage is moved back and forth on the guide rods through a link 183 (see Fig. 8) connected thereto and to a lever 184; the lever being pivoted at 185 and connected by a link 186 to the crank 131 on the drive shaft 36. The clips are pivoted at 187 and turned thereon through a lever 188 connected by a link 189 to a roller-carrying member 190 which rides up and down the inclined member 191 normally locked by a latch 192. When the latch releases the parts, link 189 moves slightly to the right permitting the clips to close over the card but this motion to the right is limited by the shoulder 195' of member 195 to hold the clips in position. At the end of the stroke, after the card has been stripped from the clips, member 195 strikes a pin 196 (Fig. 8) and being turned thereby clockwise upon its pivot, releases link 189, permitting it to move farther to the right so that the clips can turn out of the path of the card for the return stroke. The latch 192 is held normally in closed position by a spring 193 and is opened by a slight turn of the rod 194. Said rod reaches down into the base of the machine, Figs. 9 and 21, and is provided with a crank 197 adapted to be actuated by a bell crank 198 pivoted on a bracket 199. The other arm of the bell crank is in the path of a roller 200 carried by a crank 201 on the drive shaft 36. The roller thus strikes the bell crank once each revolution of the drive shaft, causing it to press against lever 197 and turn rod 194. It will be seen then that the clips 181 operate to grip a card whenever they reach the end of their stroke at the posting position. The card is then carried to the reject or file pockets 27, 28. The action here is similar to that in connection with the audit card.

The front portion 202 of the file pocket occupies a fixed position. The path of the card carries it back of this portion into the pocket and when it strikes the side 203 of the pocket it will be stripped from the clips. The front portion of fingers 204 of the reject pocket are fixed to a bracket 205, Figs. 24 and 25, slidably mounted on the side of the pocket and actuated by a bell crank 206. A spring 207 acting on the bell crank tends to move the fingers into the forward position. A link 208 connected to the bell crank reaches down into the casing 156, Fig. 41, and is attached to a crank 209 fixed on the shaft 152 supported in brackets 210. At the other end of this shaft is fixed a lever 211 carrying a roller 212 adapted to engage a cam 213 on the shaft 153. The rear end of the lever is adapted to be locked down by two latches 214, 215 (see Fig. 14). In this position the link 208 is held down and the reject pocket fingers held out of the path of the cards. The latch 214 normally holds the parts in locked condition. This latch is fixed on a rod 216 bearing in brackets 217, Fig. 41. The opposite end of the rod is provided with a lever 218 (see also Fig. 16). Adjacent said lever is a member 219 fixed on a shaft 220 which is geared to the shaft 153 for continuous rotation. The member 219 carries a pair of hinged pieces 221, each provided with a roller 222 and a pin 223. As the shaft 220 rotates the path of the rollers 222 is such that they do not touch lever 218, but an inclined guide 224 carried by a shaft 225 is movable by rocking of the shaft into and out of the path of pin 223. When this guide is raised into the path of the pin it moves roller 222 so that the latter will strike lever 218 and rock rod 216, removing latch 214 from lever 211. The guide 224 is controlled through a lever 226 on shaft 225 connected by a link 227 to a lever 228 on a shaft 229; said shaft in turn being rocked by a lever 230 adapted to be actuated by card reading or feeler pins 231 hereinafter described. After roller 222 has actuated lever 218 it is restored by the pins 223 engaging a fixed inclined guide 232. The latch 215 is normally disengaged from lever 211 and is connected by a link 233 to a lever 234 fixed on a shaft 235. This shaft as shown in Fig. 18 has fixed thereon a bail 236 and loosely mounted thereon hammers 237. The posting operation as we will presently see, is effected by a clockwise thrust of said hammers. This is accompanied by a clockwise movement of bail 236 and lever 234 which in turn brings the latch 215 into locked engagement with lever 211. In operation if the condition of the card being read is such that one of the feeler pins 231 moves forward, indicating that a payment of premium is due for the period in question, this movement, as we have seen, will be accompanied by the releasing of lever 211 by latch 214. This is timed to take place while the roller 212 is riding over the higher portion of cam 213. If the premium has been paid as determined by the presence of an audit card to match the master, the posting operation takes place. This as we have seen involves actuation of hammers 237 accompanied by the locking of lever 211 by latch 215. This is timed to take place before the lower portion of the cam 213 reaches roller 212. Thus the roller cannot follow the cam. If, however, payment has not been made so that no posting takes place the hammers remain inoperative and latch 215 remains disengaged from lever 211. Now roller 212 will follow the cam under the influence of spring 207 and the fingers 204 of the reject pocket will move forward and intercept the master card as the shuttle is carrying it by. When the hammers 237 operate and lock lever 211 the hammers are almost immediately retracted by a spring 253, Fig. 18. To prevent the lever from being unlocked at this time the latch 215 is so shaped, as at 254 as to lock into a corresponding depression in the lever. As soon as the latching is effected and before the return of the hammers, the roller 212 starts to ride down the cam. This completes the locking so that when the hammers move back and the spring 255 tends to cause the bail 236 to follow, the latch is prevented from slipping off from the lever. When the higher portion of the cam again engages the follower 212 it will tilt the lever 211 slightly, permitting the latch 215 to be moved by spring 255 to inoperative position; the bail 236 also being restored. The latch 215 may be provided with a downwardly extending tail piece 256 acted upon by a spring 257 to prevent loose action of the parts. This spring, however, is weaker than spring 255 so as not to interefere with the control of the latter.

In my aforesaid application, Serial No. 566,448, now Patent No. 1,506,382, I disclosed a non-jam device which when a card is stripped from the card clips at a wrong time, causes the machine to stop. This prevents the accumulation of cards at some intermediate position in the machine. As this device is shown and described in minute detail in said application it may be passed over more lightly in the present application. In Fig. 11 there is shown a non-jam locking bar 575. This bar is carried by the card carriage 59 along with the clips 76, 79 etc. As the carriage reciprocates the locking bar will not engage the bell crank, but as is more clearly disclosed in said copending application, when the clips lose a card the bar moves to the right with respect to the carriage as viewed in Fig. 11, so that when the carriage again moves to the right the bar will engage and actuate the bell crank 576. This in turn will depress the interconnected links, 577, 578, which are guided by an idling lever 579. The link 578 is connected to a lever 580, (see also Fig. 14) pivoted at 581 to a bracket 582. The other end of the lever 580 is curved as at 583 so as to reach under the lever 172 connected with the stop and start keys 171ª, 171. Thus, when the lever 580 is actuated by reason of a card having been dislodged from the clips, it will actuate lever 172, raising the start key and depressing the stop key, and as we have heretofore seen, this will cause the machine to stop. A spring 584 connected to lever 580 and to the bracket 582 tends to hold said lever and associated parts in normal position.

Reading and comparing the cards

Having described the driving mechanisms and the means whereby the master and audit cards are carried to their several stations, we will now turn to the mechanism whereby the reading of the cards is effected and comparisons made between the cards.

After the master and audit cards have been taken from their magazines and fed to their respective stations in the comparing unit 8, the reading pins are brought into play.

In Fig. 16 the master card is shown in its comparing position at 132ᵇ; and the audit card at 73ᵇ, the master card being between two plates 258, 259 and the audit card between two plates 271, 272. The reading pins for the master card are divided into three groups 262, 263, 264. These pins are adapted to project through holes in the plates in the well known manner, but when a card is in place between the plates it will prevent the pins from reaching through excepting when the card contains perforations corresponding in positions to the pins.

The pins 262 are adapted to read the perforations representing the policy number in field 12 of the master card, Figs. 2 and 6, and are arranged in vertical rows of four pins to the row; it being remembered that each digit is represented by one or more holes arranged according to Fig. 7 in four vertically aligned hole spaces 265. Each pin, then, cooperates with one of the hole spaces. The number of vertical rows of pins is of course dependent upon the particular problem with which the machine is designed to deal. As an illustration, in the present instance I have shown seven vertical rows. Immediately beside these pins I have shown two additional vertical rows 266, Fig. 6, which instead of cooperating with perforations in the card are adapted to cooperate with perforations in a metallic strip 267. These perforations in this strip represent the months of the year, and by raising or lowering the strip a combination of perforations representing any month may be arranged to cooperate with the pins. The pins 264 are adapted to cooperate with perforations indicating when payments of premiums are due. These perforations, it will be remembered, are made through one or more of the months in field 15, Figs. 2 and 3, when payments are due annually or at certain other periods, and through the first month only as at 21, Fig. 4, when payments are due each month. Thus, there may be two vertical rows of six pins each for field 15 and for field 16 just one pin 264ª, Figs. 17 and 19. The pins 263 are adapted to read in the zone 268, Fig. 2, the year as set forth in the square 19 of each year zone 15, 16, 17, 18. It should be pointed out here that the card in Fig. 2 represents a policy issued in the year 1921; thus the first yearly zone 15 represents that year and the zones 16, 17, 18 represent the successive years. In the case of a policy issued in 1922, that year will be represented in zone 15, etc. Thus, it will be seen that in a given card a particular year may be represented in any one of the several year zones. The object of the pins 263, then, is to find out which year zone represents the current year so that the posting operation may be effected in the proper zone. As shown diagrammatically in Fig. 6, these pins which are designated yearly zone selector pins control the punches 269 which effect the posting when the card reaches the posting station. Thus, if posting is being effected for a period in the year 1922, and the pins 263 find that year to be contained in the second of the yearly zones, those of punches 269 belonging to that zone will be released to operate at the proper time.

The reading or feeler pins 270, Fig. 16, adapted to project through holes in plates 271, 272 act upon field 273 of the audit card 24 when the latter is in the comparing position. This field, it will be recalled contains in perforations the same data as is contained in print in the upper field 274, comprising the policy number 275, the month 276 and a special designation contained in square 277.

This square may be used to indicate a lapsed condition of the policy by reason of the preceding premium being unpaid. An arbitrary character shown here in dotted lines as the digit 1 may be printed in this square when the policy has lapsed. The corresponding perforation will then, of course, appear as shown in dotted lines in field 273.

The readings of the several groups of pins acting upon both cards determine which of several conditions such as indicated at 278 exists, and govern the operation of the machine accordingly. Thus, the machine being set to operate for a given period by the manual set up of pins 264 and the strip 267, if pins 264 ascertain that a payment is due for that period and the pins 270, 262, 266 ascertain that the policy number on the audit card is the same as that on the master, and the month on the audit card is the same as that set up in the strip 267, the condition is as set forth at 278. In other words, we have a master card upon which payment of a premium is due and payment has been made. The operation as indicated by the lines 279, 280 leading from the condition 278 is to send the master card on, causing posting to be effected at the posting station as shown at 281 and then sending the card to the file pocket 28 as shown by line 282, while the audit card is sent directly to its file pocket 5. Should the same conditions of the cards obtain excepting that the audit card shows that the previous payment has not been made as indicated at 283, the current payment having been made, posting will be effected on the master card and that card sent to the file pocket, but the audit card will be sent to the reject pocket 4 for subsequent personal attention. If the pins 264 find that no payment is due for the current period we will have a case where there will be no audit card to match that master as no notice card will have been previously produced. Presuming the cards to be passing through the machine in numerical order, beginning with the higher numbers and running down, if the master card is policy number 98, there being no audit card to match, the next audit card will be of policy number 97 or a lower number. The condition then as ascertained at the comparing station is as indicated at 284; i. e., no payment due and the master card being numerically greater than the audit card. In this case the audit card will be held at the comparing station for comparison with the next master card. while the master card will be sent on to the file pocket, the posting operation being suppressed while the card is passing through that station. If for any reason a master card has been removed from the file and is therefore missing when the corresponding audit card is at the comparing station we will have a reversal of the foregoing condition, or in other words, if the audit card is of policy number 96, that master being out, the next in order and at the comparing station will be number 95 or a lower number. This condition is indicated at 285 and the master will be held at the station while the audit card passes on to the reject pocket. It will thus be seen that where the opposing cards at the comparing station do not agree in number, the one bearing the higher number will move along to the appropriate pocket while the one bearing the lower number will be held for the next comparing operation. Should the master card show a payment to be due and there be no corresponding audit card we will have the condition indicated at 286, with the master card greater or higher in number than the audit card. The master card then goes to the reject pocket and the audit card is held. If a premium has been prepaid and the fact indicated on the master by punching a hole in the posting hole space, the condition will be as shown at 287 and the master card will move on while the audit card is held.

The feeler pins 264 are mounted with their opposite ends resting in the plates 258 and 288, Figs. 34, 35, and are urged forward by springs 289 bearing at one end against collars 290 fixed on the pins and at the other end against a fixed member 291. The pins are normally held in their retracted position as shown in Fig. 34 by a bail 292 engaging the collars 290. The bail is fixed on a shaft 293 and is actuated by rocking of said shaft which in turn is effected by a lever 295 fixed on the shaft and having pin and slot connection with a lever 296, Fig. 16, fixed on shaft 297 on which is also fixed a lever 298, Fig. 15, connected by a link 299 to a lever 300 pivoted at 301 and having a cam follower 302 cooperating with a cam 303 on the shaft 153 which as we have heretofore seen rotates continuously during the operation of the machine. A spring 304 moves the bail forward and the cam 303 moves it back, the timing through the agency of the cam being such that the pins are held in retracted position while the cards are moving and are released to move forward and again retracted during the time that the card is at rest at the comparing station. Resting against the back of plate 288 I have shown a slide 305 adapted to move up and down through grooves in the sides of the pins 264 as shown in Figs. 17 and 19. This slide is adapted to prevent the pins from moving forward when released but is provided with notches 306, 307 on its opposite edges. The notch 307 is shown as being adjacent the lower or January feeler pin permitting this pin to move forward. By moving the slide upwardly the notch may be adjusted to permit any one of the pins on its side to operate. When this notch is moved above the topmost pin the notch 306 cooperates with its lower or July pin and may in turn be adjusted to cooperate with any one of its pins. Thus the slide 305 may be adjusted to permit these feeler pins to operate for any specific month. The slide may be provided with a rack or notched member 308 engaged by a lever 310; a spring 311 keeping the roller resiliently pressed into the notches. This will aid in adjusting and keeping the slide in position. A lock 311 may be provided to prevent movement of the lever 310, thus locking the roller rigidly in the notches after the slide has been set to prevent accidental displacement. The slide may be provided with an index 312 cooperating with a fixed scale 313 to facilitate its adjustment.

To operate the machine to effect posting upon cards on which payments are due in a given month the slide 305 will be set to permit the feeler pin 264 corresponding to that month to operate. Thus, when a card is presented at the comparing station and the bail 292 moves forward, that particular pin will advance if it finds a hole in the card at that month, otherwise the card will prevent the pin from advancing. The monthly feeler pin 264ª is always free to operate so that although the pin representing the particular month for which the machine is set up does not advance, if payments are due every month the monthly pin will advance. As we have heretofore seen if any of the pins advances it will actuate the lever 230 as indicated in Fig. 35, lifting link 227, Fig. 16, controlling the setting of the reject pocket to receive the card in the event that posting should not thereafter be effected.

The pins 266, Fig. 6 are not adapted to cooperate with perforations in the card but with perforations in the adjustable strip 267 disposed in front of the card. The strip is provided with a rack engaged by a spring-pressed lever 314, Fig. 16, acting as a pawl and cooperates through an index 315 with a monthly scale 316, Figs. 10 and 20. The perforations in the strp are so arranged that they may be presented for cooperation with the pins in different combinational arrangements representing the months. As in the case of the pins 264 and the strip 305, the strip 267 is set up for the month for which posting is being effected. The pins 266 as well as pins 262 are urged forward by springs 317 engaging between a fixed plate 318 and collars 31 fixed on the pins. A bail 320 engaging col lars 321 also fixed on the pins serves to restore the pins to inoperative position. This bail is fixed on a shaft 322, Figs. 15 and 16, on which is also fixed a lever 323 connected by a link 324 to a lever 325 at 326. The latter lever is fixed on a shaft 327 and carries a cam follower 328 working on a cam 329 on the upper drive shaft 161.

The pins 270 which read the audit card are urged forward by springs 330 engaging a fixed member 331 and collars 332 fixed on the pins. The restoring bail 333 for these pins acts against collars 334 fixed on the pins. This bail is fixed on shaft 327 on which as we have seen is also fixed lever 325, so that the actuation of this lever to restore the pins 262, 266 also rocks shaft 327 and actuates bail 333 to restore the audit card feeler pins 270.

The pins of groups 262, 266, 270, Fig. 26, are each yieldingly connected to a pin bar 335 by mounting the bar slidably on the pins as at 336, providing a collar 337 fixed on the pin and urging the bar against said collar by a spring 338 working between the bar and the fixed collar 321. The bars are adapted to work in fixed guide members 339. Of the four pin bars belonging to the four feeler pins of each vertical row the two upper ones are arranged in one group and the two lower ones in another group. An additional bar 340 not connected to any of the pins is associated with each group or pair of bars 335. The bars 335 are, of course, maintained in their normal position as in Fig. 26 by their connection with the pins, while the additional bar 340 is held in a corresponding position by a tension spring 341 connected to the guide 339 and a bracket 342 fixed to the bar and by stop pins 343 in the bars 335 engaging said bracket. Resting on the top bar 340 at 344 of the upper group of bars associated with pins 262, 266 is a combination comb 345, while a companion combination comb 347 rests at 348 on the top bar of the lower group. Each of these combs is urged downwardly by a spring 349 connected thereto and to a fixed frame member 350. The combs are adapted to move downwardly one, two or three steps as we will soon see and may be restored by a bar 351. This bar is secured at its opposite ends to upright pieces 352, see also Fig. 17, reaching downwardly and resting on a bail 353 the side arms 354 of which, Fig. 16, are fixed on a shaft 355. In Fig. 12 which is a view showing the parts from the opposite side, the shaft 355 is shown as having fixed thereon a lever 360 carrying a cam follower 361 working on a cam 362 on the upper drive shaft 161. The upright pieces 352 are held down upon the bail by springs 163. Thus, as the cam shaft turns the shaft 355 will rock and the restoring bar 351 will move up and down.

The restoring bar 351 moves downwardly after the feeler pins have been released to read the card. This frees the combination combs to move downwardly if permitted and o the extent permitted by the pin bars 335. Thus, if the top pin 262 finds a perforation in the card and enters, drawing its pin bar with it, this bar will, by the engagement of its pin 343 with the bracket 342 move bar 340 also, against the action of spring 341 and the comb 345 will move down two steps as shown in Fig. 27, being stopped by the bar belonging to the second feeler pin. Obviously if the second pin also advances its pin bar too will be removed from the path of the comb and the latter will move down three steps and will be stopped by a fixed stop 364. Also, it will be seen that if the second pin only should advance, its bar moving bar 340 by the pin and bracket 343, 342, the comb will drop only one step, being stopped by the pin bar connected to the top pin. This is shown in connection with the second group of pin bars, the lower of the two controlling pins having advanced with its pin bar and taking the upper bar 340 along; the middle bar remaining in normal position and stopping its comb 347. Each vertical row of four feeler pins then, is divided into two groups and each group controls the position of one of the combs. Or in other words, after the pins have read the card the combs take the reading from the pins. The combs in turn are provided along one of their edges with notches 365.

Figure 15:
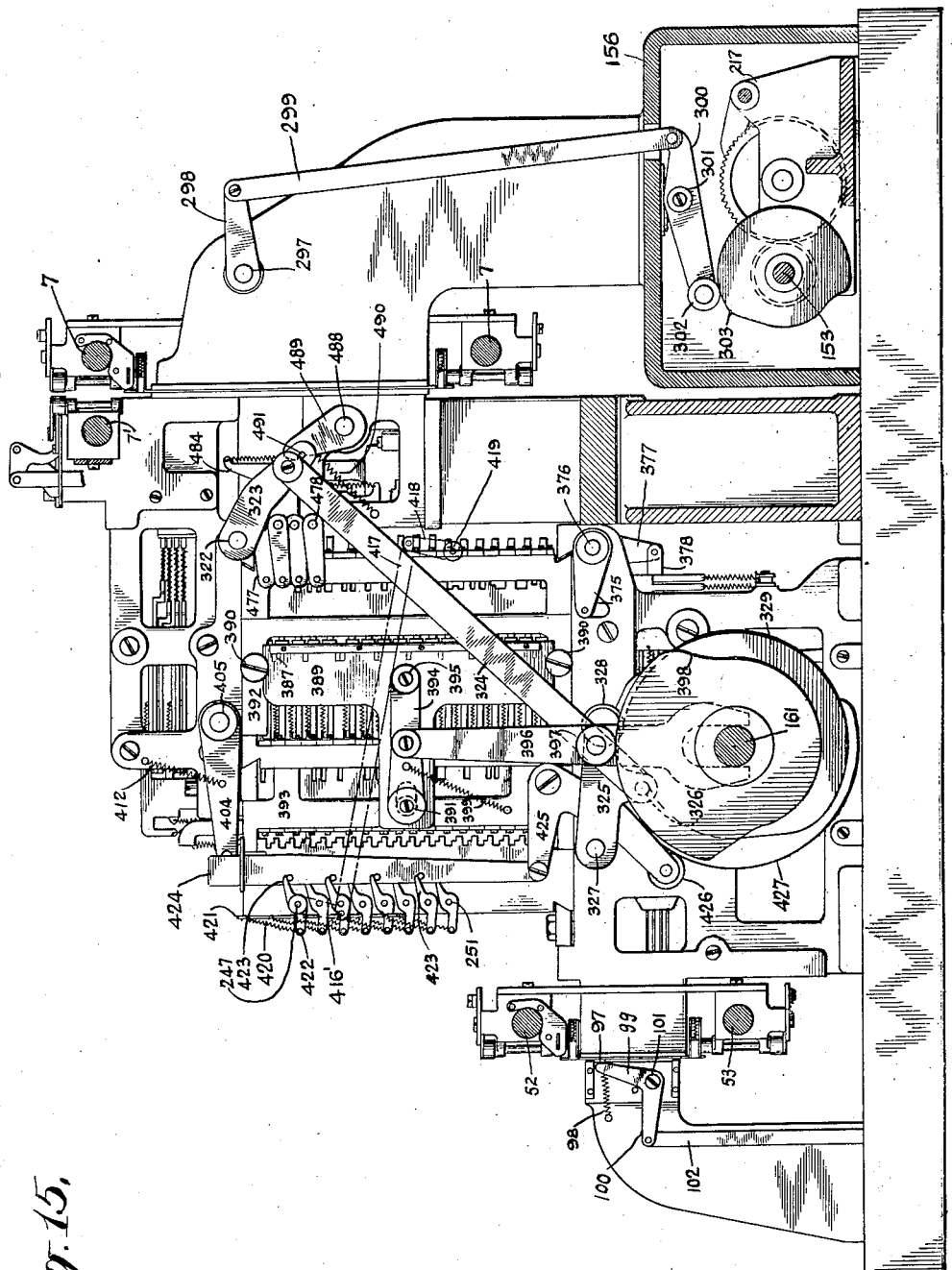
Fig. 15 is a section taken on line 15—15 of Fig. 8, showing the outside of the comparing unit.

The pin bars 335 connected with the feeler pins 270 for reading the audit card operate in the same manner as those just described and control combination combs 366, 367 through projections 368, 369 resting on the pin bars. These combs are urged downwardly by springs 370 attached thereto and to a fixed portion 371, Fig. 16, of the machine. These combs are stopped in their first and second step positions by the pin bars as shown in Fig. 27, and in the third step position by a fixed stop 372. The combs are restored by a bail 373 working against a shoulder 374 on the comb. The sides 375 of the bail, see also Figs. 15 and 16, are fixed to a shaft 376 on which may also be fixed a lever 377 connected by a link 378 to a lever 379 fixed on the shaft 355 which as we have seen is associated with the restoring bail for the master card combs and is rocked by the cam 362, Fig. 12. The same operation then will restore the audit card combs 366, 367. These combs are provided with notches 380.

For compactness of construction the combs 345, 347 may be arranged beside each other and close together to form a set. The combs 366, 367 are similarly arranged and being placed in advance of the combs 345, 347; the two sets being in the same or substantially the same plane. Adjacent the two sets of combs are a plurality of comb feeler bars 381 mounted for longitudinal movement in guide members 382. Each bar has fixed thereon a projection 383, see also Fig. 28, adapted to cooperate with the combs 345, 347 and a similar projection 384 adapted to cooperate with the combs 366, 367. A spring 385 connected to one of the guide members 382 and to the bar, it being understood that the member 386 is integral with the bar, tends to pull the bar to the left. A restoring bar 387 engaging a projection 388 on the feeler bar serves to move the latter to the right. The restoring bars are attached to their ends to common supporting members 389, Figs. 15 and 17. Said members are in turn supported by guide pins 390, 391, the latter pin engaging in a slot in one of the arms of the member 389 and the several pins being fixed in the fixed frame portions 392, 393. A toggle 394 attached at one end to the fixed pin 391 and at the other to a pin 395 in the member 389 is provided with an arm 396 bifurcated at its other end to straddle the shaft 161 for guidance. The arm 396 carries a cam follower 397 working on a cam 398. The cam raises arm 396 to spread the toggle and move the members 389 and restoring bars 387 to the right, while a spring 399 moves the restoring bars to inoperative position.

After the feeler pins have been released to read the card, setting the pin bars 335 to determine the positions to which the combination combs may move and the combs have been released to take up such positions, the feeler bars 381 are released by movement of the restoring bars 387 to the left. The feeler bars, under the influence of springs 385 will then move to the left or not, according to the positions of the notches 365, 380 in the combs.

Adjacent to the ends of the feeler bars is a bank of comparing combs 400, one comb for each vertical row of feeler bars as shown in plan in Fig. 17. Each comb is provided with stepped notches 401 adapted to cooperate with the feeler bars. The combs are urged upwardly by springs 402 attached thereto and to a fixed frame member 403 and are restored to their normal position by a bail 404 turning on a pivot 405 (see Fig. 15). As seen from the opposite side, Fig. 12, the bail is connected by a link 406 to a lever 407 pivoted at 408 and actuated by a lever 409 having a cam follower 410 cooperating with a cam 411 on shaft 161. The cam causes the bail to press downwardly on the combs and when the bail is not operating it is lifted from the combs by a spring 412, Fig. 15. The timing is such that the combs are released just after the feeler bars 381 have been released.

In Figs. 30 to 33 for convenience in reading the combination combs are shown in diagrammatic arrangement and the projection 383 on the feeler bar 381 is shown as two members instead of one. The projection 384 is similarly shown. In Fig. 30 the parts are shown in their normal positions, all of the combination combs being in the uppermost of their three positions as indicated by the appended scales; the comparing comb 400 being in its lowest position and the feeler bar 381 being in its extreme right hand position. In Fig. 31 the combination comb 347 is shown as having dropped one step, comb 345 two steps, and combs 367, 366 one and two steps respectively. The combs 347, 345 and 367 have each presented full depth notches to the feeler bar projections 383, 384 and the comb 366 has presented a shallow or half depth notch. The feeler bar when released, then, has moved one step to the left, being stopped by the shoulder 413. Accordingly, the feeler bar has advanced one step into its notch 401 in the comparing comb 400, so that the latter upon being released has risen one step. In Fig. 32 the combination combs have all presented full depth notches to the feeler bar so that the latter has moved two steps to the left, entering to full depth the notch 401 of the comparing comb. The latter comb, then, upon being released has not risen at all. In Fig. 33 the positions of the combination combs are such that the feeler bar has not advanced at all, and consequently, the comparing comb 400 has not been stopped by the feeler bar and has risen its full two steps. In this case the comb will be stopped by a fixed stop member 414, Fig. 27.

The relative positions and mode of operation of the combs and related parts are clearly shown by the perspective views in Figs. 28 and 29. In Fig. 28 the parts are all shown in their normal positions, while in Fig. 29 the combs 345, 347 are shown as having dropped two steps and one step respectively and the combs 366, 367 as having dropped like distances. One of the feeler bars has then advanced one step and thus permitted the comparing comb 400 to rise but one step.

Adjacent the comparing combs are several bails 415. These bails are adapted to cooperate with notches 416 in the comparing combs and are fixed to the rods 247, 251 which, when rotated, will as we have seen, raise the bars 244, 245 to cause the audit card to be sent to the file pocket. On the rods 247, 251 are levers 422, Fig. 15, connected by springs 420 to a fixed frame member 421. These springs are adapted to turn the rods 247, 251 clockwise as seen in Fig. 15 to turn the bails 415 into the notches 416 in the comparing combs as in Fig. 27. The rods are provided with additional levers 423 engaging pins on an arm 424 which, in turn, is connected to a bell crank 425 having a cam follower 426 working on a cam 427 on shaft 161. The timing is such that the cam releases the bails after the comparing combs have assumed their reading positions, and restores them again to normal position before the restoration of said combs.

The relationship of the notches 416 in the several comparing combs to the bails 415 is illustrated diagrammatically in Fig. 20ᵃ. Here the bails are represented by lines drawn across the several combs. The shaded portions of the edges of the combs represent the notches therein. All of the upper notches are located one step below the upper bail. All of the second row of notches are one step below their bail except the last one which is adjacent the bail, etc. Each comb, it will be understood corresponds to one of the digits in a number. Thus, for a number running into the millions, but less than ten millions, seven combs will suffice. If a given digit of a number on the master card is the same as the digit occupying the corresponding position on the audit card, the feeler pins of the two cards will permit their respective combination combs to drop like distances. The feeler bars will then permit the comparing combs 400 to rise one step. Thus, if all of the digits of a number are the same on both cards all of the comparing combs will rise one step. As shown in Fig. 20ᵃ all of the upper notches 416 will then be brought adjacent the upper bail and the latter will drop in.

It will be seen (Fig. 26) that some of the feeler bars are one step farther removed from the comparing comb than others; also, that the projections on such bars for cooperating with the audit card combination combs are one step farther from the said combination combs than those on said other feeler bars, while all of the projections for cooperating with the audit card combination combs are similarly disposed with respect to the combs. The reasons for setting some of the feeler bars back in this way have nothing to do with the present invention and will therefore not be dealt with here. The effect of such arrangement is that the bars thus set back must advance one step farther in the direction of the comparing comb than the other bars to produce the same result upon said comparing comb. If the set-back bars are permitted by the master card combs to advance but are held by the audit card combs, their advance will be but one step and will have no effect upon the comparing comb. If a set-back bar is permitted by the master and audit card combs together to advance two steps it will in turn permit the comparing comb to rise one step. If such bar advances three steps the comparing comb will not rise at all. On the other hand, if the lower feeler bars advance one step the comparing comb will rise one step, and if such bar advances two steps the comb will not rise at all. The notches in the master and audit cards are such that when the combs are positioned by cards that compare, the feeler bars will advance so that all of the comparing combs will rise one step. The posting bail will then operate as we have seen, to effect posting and to cause the cards to go to their file pockets. More specifically, presuming the policy number to contain seven digits, each digit will be taken care of by one of the comparing combs designated 1st to 7th inclusive. If the first digit on the master and audit cards is the same the 1st comb will rise one step, etc. If all of the digits compare except the fifth, then the 5th comb will not rise one step. In such case this comb will either not rise at all or it will rise two steps. If this comb should fail to rise the posting bail will not operate and the only bail free to operate is the 5th bail (the month comparing combs are presumed to be in operation). Operation of any of the 1st to the 7th bails will hold the audit card at the comparing station and feed the master to reject, replacing it with another master at the comparing station. Should several of the digit combs fail to rise the one farthest to the left will dominate. Thus, should the 3rd and 5th fail to rise the 3rd comb will lock out the 5th bail but the 5th comb cannot lock out the 3rd bail and only the 3rd bail will operate. The effect of the operation of the 3rd bail on the card feeding is the same as that of the 5th but the reason for causing the comb to the left to dominate will appear presently. Now presume the 5th comb to rise two steps, (all others rising one). None of the bails will operate as this comb will now lock out even the 5th bail. In this case, under the normal operation of the machine the master card will be held and the audit card fed to reject and the next audit card fed to the comparing station. Should the 5th comb rise two steps and the 3rd comb fail to rise the 3rd comb again dominates and permits operation of the 3rd bail. From the foregoing it will be recognized that if the two numbers that are being compared differ in one of their digits the comparing bail corresponding to the position of that digit in the number will either fail to rise or will rise two steps. And if the number differs in several of its digits the several corresponding bails will be governed accordingly, and the one farthest to the left will dominate. By so cutting the notches in the combination combs that where the two numbers differ at a particular point or digit, if the greater of the opposing digits is in the master card the corresponding feeler bar will operate to prevent the comparing comb from rising and where the digit in the audit cards is the greater the bars will permit the comparing comb to rise two steps it will be seen that if the number of the master card is greater, that card will move on and another take its place, the audit card being held; and if the audit card number is greater it will move on and be replaced by the next one while the master is held. The proper notching of the combination combs for this result may be determined by trial lay-outs and the process of elimination.

If the pins for reading the month in the audit card should disagree with the month set-up of the machine, one or both of the month comparing combs X, Y, will fail to rise, or will rise two steps suppressing posting and the machine will proceed.

The top rod 247 (Fig. 15), besides being connected to the depending rod 244 to control the pocket action, is connected through a lever 416′, link 417 and lever 418 to a shaft 419 to control the posting operation. The manner in which this is done will be more readily seen by first describing the posting mechanism.

The posting as we have seen is effected by punching a hole 25, Fig. 2, through the card. These perforations are made opposite the month in which the payment is due, and as payment may fall due in any one or several months of the year, the machine is adapted to post for any month. The punches 428, Fig. 18, are arranged in vertical rows of six, corresponding to the positions of the six posting hole spaces opposite each vertical row of months, and as the card here illustrated contains four yearly zones or eight vertical rows of six months each the machine may be provided with eight such vertical rows of punches as shown in plan in Fig. 17. The punches are supported and guided at one end by a frame 429 (Fig. 35) and at the other by one of the plates 430 between which the card 132$^c$ rests during posting operations. A lever 431 may be associated with each vertical row of punches. These levers are pivoted at 432 and engage the punches in a notch 433, Fig. 17, in the side of each punch; the notch being wider than the lever so that the latter may move forward with one punch when the latter is operated as in Fig. 39, without carrying the others with it. A spring 434 attached to each lever and to a frame member 435 serves to hold the lever normally in the position shown in Fig. 38, and thus returns the punches to normal position after they have operated. To guard against possible failure of the spring to withdraw the punch from the card additional and positive means may be employed. This is shown in the form of a bail 436, see also Fig. 20, fixed to a shaft 437, which in turn is provided with a lever 438, Fig. 14, resting normally on a pin 439. A cam 440 on shaft 441 which is operated through a chain of gears 442, 443 by the shaft 161, serves to raise lever 438 at the proper times. This presses the bail 436 against any lever 431 that may not have returned to normal position under the tension of its spring and forces it back.

Adjacent the rear end of the punches is a frame 444, Figs. 17, 18, 20, 38, and 39 slidably mounted between vertical guides 445 on fixed portions 446 of the machine. The frame 444 has threaded connection at 447, Fig. 18, with an adjusting rod 448 which, in turn, is threaded in a projection 449 on the machine frame. The upper end of the rod rests in a sleeve 451 and has a keyway 452 cooperating with a key 453 in the sleeve. The sleeve rotates in a bearing member 454 and is prevented from longitudinal movement therein. A stem 457 and knob 458 fixed to the sleeve may be provided to rotate the same. It will be seen that rotation of the knob will cause the adjusting rod to rotate and screw up or down in member 449. At the same time the oppositely pitched threads connecting the rod to the frame or carriage 444 at 447 will not only cause said carriage to move up and down but to do so at a two to one ratio with the rod. The carriage supports an upper and a lower row of plungers 459, 460 adapted to engage the punches to actuate the same, but normally spring-pressed out of engagement therewith. In the lower position of the carriage the upper plungers 459 may be adapted to register with the January punches. Raising of the carriage will then cause these plungers to register with the punches for February and the succeeding months to June. Further raising of the carriage will raise the upper plungers above the punches and will bring the lower row of plungers 460 into register with the July punches and so on to December. A bracket 461 on the carriage may be provided with a scale 462 of the months, cooperating with a fixed index 463 to indicate the month for which the plungers are set, and a spring pressed detent 464 may be adapted to cooperate with a depression in the collar 456 when a set of the plungers registers correctly with the punches.

Back of the plungers are the punch hammers 237 heretofore referred to in connection with the control of the master card reject pocket. As seen in Fig. 17 there are four of these hammers, one for each set of upper and lower plungers 459, 460 and as each of such sets of plungers is associated with the punches belonging to one year zone, each hammer is then identified with one of the year zones. When a plunger 459 registers with any of the punches, its hammer is adapted to strike it when thrust forward, but the hammer will miss the plunger 460. When, however, the plunger 460 is in position with respect to the punches it will be struck by the hammer and the plunger 459 will not be. The hammers are normally held in inoperative position by the springs 253. Back of the hammers, on the shaft 441 heretofore referred to, are fixed four actuating dogs 467, one for each hammer. Each of these dogs comprises a main body portion to which are pivoted a pair of levers 468, see also Fig. 40, having a roller 469 and a projection 470. Fig. 40 shows one of the levers 468 folded into the body portion of the dog and the other in the outer operative position. A spring 471 on the body portion may be provided to press against the lever to hold the latter in whichever position it may be positively moved to against displacement by centrifugal force or otherwise. If the lever and roller 469 are in the outer position when they pass the hammer the roller will engage the hammer and press it against the plunger to move the punch forward. If the roller is in the inner position it will not touch the hammer and no posting operation will take place. In the path of the projecting pins 470 of each dog, the latter turning counter-clockwise, are three inclined guide members 472, 473, 474. The guides 474 are fixed and if a hammer has been actuated by one of the rollers 469, the projection 470 will engage the guide and the parts will be restored to inoperative position. The guides 473 are carried by separate shafts 475, each shaft representing one of the year zones and carrying the guide associated with the dog and hammer belonging to that zone. These shafts in turn are provided with levers 476 cooperating through pin and slot engagement with levers 477 on shafts 478. Each shaft 478 has a downwardly reaching lever 479. This lever is normally held in the position shown in Fig. 34 by a pin 480 on a member 481. Said member is supported by guides 482, 483 and is adapted to slide up and down. A comb 484 is also adapted to slide up and down in guides 482, 483 and is provided with a spring 485 tending to pull it down. A lever 486, however, engages a pin 487 on the comb and holds it normally in the upper position. This lever is fixed on a shaft 488. As shown in Fig. 15 this shaft has fixed thereon a lever 489 acted upon by a spring 490 tending to rock the shaft counter-clockwise, but engaged by a pin 491 on lever 323 to rock the shaft clockwise under the influence of cam 329. A spring 492 connects the comb 484 to the member 481, so that when the comb is in the upper position said member will be in its upper position, and a pin 493 on the comb engaging the member serves to move the latter downwardly when the comb moves in that direction. The zone finding feeler pins 263, of which there are two vertical rows of four pins each for reading in field 268, Fig. 2, the year shown in the sub-field 19 of each yearly zone, are provided with stop projections 494. The pins are urged forward by springs 495, Fig. 16, and are restored by a branch 496 of lever 486. When shaft 488 turns counter-clockwise to release the pins, the combs 484 will be released at the same time, so that as the stops 494 move forward with those of the pins that advance the combs will settle down upon said stops in Figs. 34 and 35 the bottom of the comb is cut to represent the digit 2. Thus, if the second pin from the bottom advances as in Fig. 35, which pin represents said digit according to the combination scheme in Fig. 7 the comb will be permitted to drop its maximum distance. It will readily be seen that if any other pin should advance its projection 494 would stop the comb after it had made but half its downward stroke. The second vertical row of pins 263, which in Figs. 34 and 35 are hidden beside those there shown may be constructed like those shown with the stops 494 adapted to cooperate with a comb which as represented by the dotted lines 495$^b$ is to one side of comb 484 and secured to the latter by rivets 495$^a$. The comb 495, of course, moves up and down with comb 484. Its lower edge may be cut for any digit combination, and if it is not stopped by any of the stops 494 on its set of pins it will be free to move its full downward stroke. If it is stopped by a stop 494 it will hold comb 484 back with it. Thus, if the two combs are cut for the year '22, and any of the pins other than those representing these digits should advance the comb 484 will be stopped in its downward stroke. When the comb 484 moves its full downward stroke its carries the members 481 sufficiently far to cause the pin 480 to release lever 479 as in Fig. 35 so that the latter may move under the influence of a spring 497, Fig. 17. This spring is attached to a fixed bracket 498 and to a depending lever 499 on the shaft 478; each of these shafts being provided with such a spring. The clockwise rotation of shaft 478 causes, through levers 477, 476, counter-clockwise rotation of shaft 475, so that, as indicated in Figs. 38, 39, the guide 473 will be turned into the path of the pin 470. The shape of the guide as shown in Fig. 10, is such that it will turn the pin and the roller 469 to the outer or operative position shown in Fig. 40, thus setting the dog to actuate the posting hammer when it reaches that position. The restoration of the guide 473 and the member 479 is effected as follows: Each of the rods 475 has a lever 571, Figs. 14, 17. These levers are adapted to be engaged by pins 572 on a double crank 573 fixed on the shaft 441. The actuation of the levers 571 rocks the rods 475 clockwise as seen in Fig. 14. This will move the guides 473 out of the path of the dog pins 470, and at the same time depresses levers 476, 477, and rocks rods 478 counter-clockwise, moving member 479 from the position shown in Fig. 35 to that shown in Fig. 34. The pin 480 being raised by the action of the lever 486 will then lock the parts in this position.

The guides 472 are normally in the path of the pin 470 and their inclination is such, Fig. 10, that if they remain in the operative position they will move the roller 469 back to inoperative position. This guide, as we have seen is connected to the upper bail 415. The notches 416 in the several combs 400 are so arranged that when the policy numbers on the opposing master and audit cards are the same and the month on the audit card is the same as that set up in the machine by the strip 267, the positioning of these combs will align the upper notches with the upper bail and the latter will fall in. This operation of the bail, besides raising rod 244 to send the master card to file will actuate link 417 and turn guide 472 to inoperative position to permit the dog to actuate the posting hammer. Should the cards fail to compare as to number and month the upper bail 415 will not operate, and the guide 472 will remain in normal position and will render the dog inoperative so that no posting will take place. It is, of course, to be noted that only one of the several guides 473 moves to operative position at a time, and that is the one corresponding to the active year zone on the card being read, but the guides 472 may all be actuated simultaneously as is shown here. Thus, when any of the dogs is rendered operative by one of guides 473 it will remain so or not according to the position of the group of guides 472.

We have seen that when any of bails 415 operate they raise one of rods 244, 245 and thereby control the destination of the audit card. The raising of these rods also controls the feeding of cards. In Fig. 9 the shaft 36 is shown as carrying a cam 500 adapted to actuate a lever 501 fixed on a shaft 502 and held normally in the position shown by a spring 503. The shaft 502 is thus caused to rock back and forth. To the shaft is fixed a lever 504 connected to a rod 508 having at its opposite end a latch 505; the latch being pivoted to the end of the rod and held by a spring 506 against a pin 507 in the rod. The free end of the rod rests on a bell crank 509, see also Fig. 44 and slides back and forth thereon. In its reciprocatory movements the latch 505 normally passes under the lever 510 fixed on an upright shaft 532, Figs. 44, 23, 9, having a lever 533 connected by a link 534 to a lever 535 on the upright shaft 89' which controls the clip mechanism for the master card as in the case of shaft 89 in Fig. 47.

As the latch does not normally touch the lever 510 the shaft 89' is normally not actuated and the card feeding clips will not take a card from the magazine or the comparing station. When any of the bails 415 operates, however, and raises one of rods 244, 245, these rods, besides controlling the pockets will engage a projection 511, Fig. 43, on a bell crank 512, Fig. 23, and rock the same about its pivot 513. The other arm of the bell crank is connected to a link 514 connected to the bell crank 509, see also Fig. 44. Thus the bails 415 cause bell crank 509 to raise the rod 508 so that the latch 505 will in its next right hand reciprocatory movement engage lever 510 as in Fig. 46, and turn shafts 532 and 89' which in turn will cause the card clips to take cards from the master card pocket comparing station.

There may be occasions when a master card will be out of proper order in its stack, as for instance, No. 25 may be between Nos. 99 and 98. In such case the master card No. 25 will be in the comparing station when the audit card No. 98 is there. The audit card being of the higher denomination will be fed through and subsequent audit cards also being of higher denominations will continue to feed through until audit card No. 25 is reached. When the operator sees only audit cards feeding through and therefore, suspects that a wrong master card is at the comparing station he may cause it to be taken from that position by pressing a key 515. The stem of this key rests upon an arm 516, Figs 11 and 21. This arm is similar to the arm 517 shown in Figs. 50, 51 and are preferably adjacent each other as shown in Fig. 21. The arms are attached at one end to levers 518 pivoted to a depending bracket 519 and are held normally upward by springs 520 which also tend to pull the arms toward the right so that their upward projections 521, 522 bear against bell cranks 523, 524. The arms are provided with lugs 525, 526 resting normally above bell cranks 527, 528. The bell crank 527 is connected to a link 529, see also Fig. 23, which is connected at its other end to a depending lever 530 loosely pivoted at 513 with the bell crank 512. The lever 530 has a lug 531 overreaching the lower arm of the bell crank 512 so that when the link 529 is moved to the left as seen in Fig. 23 it will cause bell crank 512 and link 514 to follow, but the bell crank and arm 514 may be moved in such direction withoutout affecting the link 529. Thus, the depression of key 515 pulls link 514 to the left, actuates the bell crank 509, and this, as we have seen, causes the card clips to take the master cards from the magazine and the comparing station. After one card has been fed from these positions by manual control it is preferable that the card feeding should immediately revert to automatic control even though the operator should be tardy in releasing the control key. To this end the shaft 532 is provided with an additional lever 536, Fig. 21, connected by a link 537 to the bell crank 523. Thus, the same movement of shaft 532 that trips the card clip latch to render the clips operative also actuates the bell crank 523 moving the arm 516 to the left so that its lug 525 will release the bell crank 527 and permit the parts to resume their normal positions.

Similar manual control means are provided for causing the audit card clips to feed the audit cards. The clips, as we have seen, grip and feed the cards when the shaft 89 turns and unlatches the inclined member 82 as in Fig. 49. This is effected by a cam 541, Fig. 13, which engages a lever 542, rocking it about its pivot 543. As shown in Fig. 42, the lever carries at its upper end a pin 544 normally engaged by a latch 545 the other end of which is attached to a lever 546 fixed on the aforesaid shaft 89, Figs. 13 and 21. The action of the spring 84, Fig. 47, upon shaft 89 pulls the latch 545 to the left as viewed in Figs. 21 and 42. The action of the cam 541 upon lever 542 pulls said latch to the right once each revolution of shaft 36 to unlatch member 82 so that the clips will receive the cards. Thus, normally the audit card clips grip and feed the cards each stroke of the carriage. When, however, the master card at the comparing station is of a higher denomination than the opposing audit card, the master cards will feed as usual during the next stroke but the audit card remains by reason of the raising of the bail-controlled rod 245, which as shown in Fig. 42 has a projection 563 adapted to lift the latch 545 away from the pin 544 as shown in Fig. 45. The lever 542 may now rock without actuating the latch and no audit cards will be fed during the corresponding stroke of the shuttle. When the parts are in the positions shown in Fig. 45 and the operator depresses key 538 to actuate bell crank 540 through arm 517, bell crank 528 and link 539, the bell crank 540 presses down upon the latch moving it into locked engagement with pin 544 against the action of the bail springs 420, Fig. 15, that cause the lifting of rod 245. Lever 542 will then actuate the latch and the card clips will operate to feed the audit cards. As in the case of the master card manual feed control, when the key 538 is depressed to bring about the turning of shaft 89, a lever 564, Fig. 21, on said shaft and connected by a link 565 to a bell crank 566, causes the bell crank to press laterally against the lug 522 on the arm 517, Fig. 50, moving the arm to the left as indicated in Fig. 51, so that although the operator may still hold the key down, the bell crank 528 is free to move back to normal position to restore the card feeding to automatic control. Thus depression of key 538 causes feeding of only one card.

When the cards are run through the notice writing machine, if the previous premium has not been paid this is indicated on the audit portion of the notice card by printing the digit 1 as at 277, Fig. 5, and of course, also perforating a hole 277'. When this card is now reached in the posting machine, it will compare with its master card and the usual posting operation for the current period will take place. This, as we have seen involves the raising of the rod 244, Fig. 43, which besides controlling the posting operation, tilts the bell crank 239 so that the projection 241 will be moved under pin 242 to hold lever 238 in its upper position to cause the audit card to go to the file pocket. In the present instance, however, it is desired to have the audit card deposited in the reject pocket so that the prior premium condition may be investigated. To this end a special feeler pin 370$^a$, Fig. 17, is provided to operate when the hole 277' exists in the card. This pin may control a special blank comb 366$^a$ in the same manner that the combs 366 are controlled by pins 270, or as shown in Fig. 16$^a$ the pin 270$^a$ may operate a single pin bar 335$^a$. Thus, when the pin moves forward and the bail 373 lets the combination combs down, the comb 366$^a$ will move down under the influence of a spring 370$^a$ until it engages a stop 567. The comb 366$^a$ engages a bell crank 568, Fig. 16, so that when it moves downwardly it rocks the bell crank, and through a link 569 and a bell crank 570, depresses the arm 252. As we have heretofore seen and as is shown in Fig. 42 the arm 252 engages the bell crank 239 after the bar 244 has placed the projection 241 under the pin 242, and moves the projection beyond said pin so that the lever 238 may operate as usual and cause the audit card to go to the reject pocket.

After the machine has completed its posting operation, if there are several master cards remaining in the supply pocket and no more audit cards, such master cards may be fed out of the machine by depression of key 515 several times.

Having described my invention, what I claim and desire to secure by Letters Patent is:

1. In a machine adapted to be controlled by record sheets, means for analyzing a plurality of sheets, means for effecting a record upon at least one of said sheets, and means controlled by said analyzing means for controlling said record effecting means.

2. In a machine adapted to be controlled by record sheets, means for feeding opposing sheets simultaneously through the machine, means for analyzing such sheets, means for effecting a record upon at least one of said sheets and means controlled by said analyzing means for rendering said record effecting means operative when the sheets bear a predetermined relationship to each other.

3. In a machine adapted to be controlled by record sheets, means for feeding opposing sheets simultaneously through the machine, means for comparing predetermined designations on opposing sets of sheets, and means brought into operation by said comparing means when said designations match for effecting a record upon one of the sheets.

4. In a machine adapted to act upon and to be controlled by record sheets, means for feeding record sheets through the machine, means for comparing predetermined designations on a plurality of such sheets, and record-effecting means controlled by said comparing means.

5. In a machine adapted to act upon and to be controlled by record sheets, means for feeding record sheets through the machine, means for comparing predetermined designations on a plurality of such sheets, and record effecting means brought into operation by said comparing means when the designations being compared bear predetermined relation to each other.

6. In a machine adapted to act upon and to be controlled by record sheets, means for feeding opposing record sheets through the machine, means for sensing identification data on the sheets, and means controlled by said sensing means for altering the relative positions of said opposing sheets in the machine.

7. In a machine adapted to act upon and to be controlled by record sheets, a comparing station, means for feeding opposing sheets to said station, means for analyzing the sheets at said station, and means controlled by said analyzing means for removing one of the sheets from said station when they bear other than a predetermined relation to each other.

8. In a machine adapted to act upon and to be controlled by record sheets, a comparing station, means for feeding opposing sheets to said station, means for analyzing the sheets at said station, and means controlled by said analyzing means for removing one of the sheets from said station when they bear other than a predetermined relation to each other, and for feeding another sheet to the place thus made vacant.

9. In a machine adapted to act upon and to be controlled by record sheets, a comparing station, means for feeding opposing sheets to said staton, means for analyzing designation characters on said opposing sheets, means controlled by said analyzing means for effecting a record upon one of the sheets when the designation characters of the opposing sheets bear a predetermined relation to each other, and means for rejecting and replacing one of the sheets when said characters bear other than said predetermined relation to each other.

10. In a card controlled machine, card feeding means, means for reading a plurality of cards simultaneously, and means controlled by said reading means for controlling said feeding means.

11. In a card controlled machine, card feeding means, means for reading a plurality of cards simultaneously, means controlled by said reading means for controlling said feeding means, and means also controlled by said reading means for effecting a record upon a card.

12. In a card controlled machine, card feeding means, means for reading a plurality of cards simultaneously, means controlled by said reading means for controlling said feeding means, means for effecting a record upon a card and means also controlled by said reading means for disposing of the cards.

13. In a machine adapted to be controlled by perforated record sheets, means for sensing perforations in a plurality of sheets simultaneously, combination combs controlled by said sensing means, feeler bars controlled by said combs, reading means for said bars, and means controlled by said reading means for effecting a record on a record sheet.

14. In a card controlled machine, card feeding means, means for reading a plurality of cards simultaneously, and means controlled by said reading means for effecting a record on a card.

15. In a posting machine, means for feeding a plurality of record sheets to predetermined positions in the machine, means for sensing data on said sheets in such positions, means for carrying one of the sheets from its position toward a plurality of stations, means for causing a predetermined one of said stations to normally receive the sheet and means controlled by said sensing means adapted to cause another of said stations to receive the sheet.

16. In a posting machine, a comparing station, means for feeding a plurality of record sheets to said station, means for sensing data on said sheets at said station, a posting station, means for carrying one of the sheets to said posting station, means for posting a record upon said one of said sheets, and means controlled by said sensing means for controlling said posting means.

17. In a posting machine, a comparing station, means for feeding a plurality of record sheets to said station, means for sensing data on said sheets at said station, a posting station, means for carrying one of the sheets to said posting station, means for posting a record upon said one of said sheets, means controlled by said sensing means for controlling said posting means, a plurality of depositing stations and means for carrying the sheets to predetermined ones of said depositing stations.

18. In a posting machine, a comparing station, means for feeding a plurality of record sheets to said station, means for sensing data on said sheets at said station, a posting station, mean for carrying one of the sheets to said posting station, means for posting a record upon said one of said sheets, means controlled by said sensing means for controlling said posting means, a plurality of depositing stations, means for carrying the sheets toward said depositing stations and means controlled by said sensing means for causing the cards to be deposited in certain of the last mentioned stations in accordance with the operations of said sensing means.

19. In a machine for posting a record upon a record sheet, means for identifying data on a plurality of sheets, means adapted to enter a record upon one of said sheets and means controlled by said identifying means for effecting or suppressing the operation of said record entering means.

20. In a machine for posting a record upon a record sheet, means for identifying data on a plurality of sheets, means adapted to enter a record upon one of said sheets and means controlled by said means for effecting or suppressing the making of a record upon at least one of the sheets bearing said data in accordance with the interrelationship of such data.

21. A machine for applying data to a record, said machine having means for identifying at least two records and means controlled by said identifying means for applying data to at least one of the identified records when the several records match.

22. In a record-sheet-controlled apparatus, the combination of means for analyzing perforations in several fields of a record sheet, means for analyzing perforations of another record sheet, and means controlled by both of the said analyzing means for making a record in one of the fields thus analyzed.

23. In a record-sheet-controlled machine, means for analyzing data in a plurality of fields of one record sheet, means for analyzing data on another record sheet, and means controlled by said above named means for making a record in one of the fields.

24. In a record-sheet-controlled machine, means for analyzing data in a plurality of fields of one record sheet, means for analyzing data upon another record sheet, means for making a record in a plurality of fields thus analyzed, said record making means being controlled by said first and second named means.

25. In a machine adapted to be controlled by record sheets, means for sensing identification data on a plurality of record sheets, means for analyzing data in a plurality of fields on one of such sheets, means for making a record in any one of such fields, means controlled by said sensing means for controlling the operation of said record making means and means controlled by said analyzing means for determining which field said record making means shall operate upon.

26. In a machine adapted to be controlled by record sheets, means for sensing identification data on a plurality of record sheets, means for analyzing data in a plurality of fields on one of such sheets, separate means for making a record in each of such fields, means controlled by said sensing means for controlling the operation of said record making means, and means controlled by said analyzing means for selecting one of said record making means for operation.

27. In a machine adapted to be controlled by record sheets, means for sensing identification data on a plurality of record sheets, means for analyzing data in a plurality of fields on one of such sheets, means for making a record in any one of such fields, separate actuating means therefore, means controlled by said sensing means for causing operation of any one of said actuating means, and means controlled by said analyzing means for determining which of said actuating means shall operate.

28. In a machine adapted to be controlled by records, means for matching perforations in a plurality of records, means for applying data to one of the records thus matched, said last named means being controlled by said first named means.

29. In a machine adapted to be controlled by records, means for matching perforations in a plurality of records, means for applying data to one of the records thus matched, said last named means being controlled by said first named means and means for determining the location of application of such data.

30. In a machine adapted to be controlled by records, means for matching perforations in a plurality of records, means for applying data to one of the records thus matched, said last named means being controlled by said first named means and means controlled by one of the records for determining the location of application of such data.

31. In a machine adapted to be controlled by records, means for comparing a plurality of records with each other, means for comparing one of the records with a set-up in the machine, and means controlled by both of said foregoing means for applying data to one of the records.

32. In a machine adapted to be controlled by records, means for matching perforations in a plurality of records, means for applying data to one of the records thus matched, said last named means being controlled by said first named means, a plurality of receptacles, and means for selectively depositing said records in said receptacles.

33. In a machine adapted to be controlled by records, means for matching perforations in a plurality of records, means for applying data to one of the records thus matched, said last named means being controlled by said first named means, a plurality of receptacles, and means controlled by said matching and said data applying means for depositing the records in said receptacles.

34. In a machine adapted to be controlled by records, means controlled by a plurality of records for applying data to one of the records, a plurality of receptacles, means for depositing the records in said receptacles, means controlled by another of the records for determining the receptacle in which the record to which said data is applied shall be deposited.

35. In a machine adapted to be controlled by records, means controlled by a plurality of records and by a set-up in the machine for applying data to one of the records, a plurality of receptacles, means for depositing the records in said receptacles, means controlled by another of the records for determining the receptacle in which the record to which said data is applied shall be deposited.

36. In a machine adapted to be controlled by records, means controlled by a plurality of records for applying data to one of the records, a plurality of receptacles, means for depositing the records in said receptacles, means controlled by the several records for normally causing one of the records to be deposited in a predetermined one of said receptacles and means controlled by one of the records for causing said first named one of said records to be deposited in another of said receptacles.

37. In a machine adapted to be controlled by records, means for sensing identification data on a plurality of records simultaneously, and means controlled by said sensing means for determining the relative order of the records.

38. In a machine adapted to be controlled by records, means for feeding a plurality of records, means for sensing identification data on such records, means controlled by said sensing means for determining the relative order of the records, said feeding means being controlled by said determining means.

39. In a machine adapted to be controlled by records, separate means for feeding records from a plurality of groups of records, means for comparing the records from the several groups, said feeding means being controlled by said comparing means.

40. In a machine adapted to be controlled by records, separate means for feeding records from a plurality of groups of records, means for comparing the records from the several groups and means controlled by said comparing means for suppressing the feeding of records from one of such groups.

41. In a record-controlled machine, means for differentially feeding records through the machine, means for sensing data on such records, said feeding means being controlled by said sensing means.

42. In a record-controlled machine, a plurality of record feeding means, perforated record comparing means controlled by the ordinal relationship between the records being fed by each of said feeding means, said feeding means being controlled by said comparing means.

43. In a record-controlled machine, a plurality of record feeding means, perforated record comparing means controlled by the ordinal relationship between the records being fed by each of said feeding means and means controlled by said comparing means for selectively suspending the effectiveness of said feeding means.

44. In a record-controlled machine, a plurality of supply stations, means for feeding records from said stations, means for comparing the ordinal relationship of the records being fed from the several stations, and means controlled by said comparing means for controlling said feeding means, said controlled means being adapted to suspend feeding from one of said stations when the records being fed therefrom are ahead, in order, of the records being fed from another of said stations.

45. In a record-controlled machine, a plurality of supply stations, means for feeding records from said stations, means for comparing the ordinal relationship of the records being fed from the several stations, and means controlled by said comparing means for controlling said feeding means, said controlled means being adapted to synchronize the order of feeding from the several stations.

46. A machine of the class described having an item comparer, said comparer being differentially controlled in accordance with the relative values of a plurality of compared items one with another.

47. In a record-reading machine, a plurality of records having ordinal designations and adapted to be arranged in predetermined order, means for sensing such designations and adapted to be differentially controlled in accordance with the ordinal position of a record with respect to the adjacent records.

48. In a record-controlled machine, means for sensing data on a plurality of records, and means controlled in accordance with the readings taken from said plurality of records for posting additional data on one of the records.

49. In a record-controlled machine, means for sensing data on a plurality of records, position selecting means for at least one of the records, and means controlled in accordance with the readings taken from said plurality of records and in accordance with said position selecting means for applying additional data to at least one of the records.

50. In a bookkeeping machine, means for reading data on a plurality of records and means controlled by said first named means for posting data on one of such records.

51. In combination, a record having active and inactive zones, data sensing means for cooperating with said record adapted to distinguish between the active and inactive zones, means for sensing data on another record, and means controlled by both of said sensing means for applying a data designation to one of said zones.

52. In combination, a plurality of groups of records, the records of each group being arranged in predetermined order, the order in the several groups being correlated, means for sensing data on the records of each group, means for disposing of the records, and means controlled by said sensing means for differentially controlling said disposing means in accordance with the order of the records in the groups.

53. In a machine for analyzing records, means for sensing data on records in a plurality of groups, means controlled by said sensing means for comparing the records of one group with those of another group, record-feeding means differentially controlled by said sensing means, and manually operable means adapted to overcome said control of said sensing means to control said feeding means.

54. In a machine for analyzing records, means for sensing data on records in a plurality of groups, means controlled by said sensing means for comparing the records of one group with those of another group, record-feeding means differentially controlled by said sensing means, and manually operable means adapted to overcome said control of said sensing means to control said feeding means and means for limiting the duration of the effect of said manual means.

55. In a record-controlled apparatus, means for feeding a plurality of records into operative positions, means adapted to compare certain items on said records with each other and to control the subsequent operation of the apparatus.

56. In a record-controlled apparatus, means for feeding a plurality of records into operative positions, means adapted to compare certain items on said records with each other and to control the subsequent operation of the apparatus in accordance with the result of said comparison.

57. In a perforated-record-controlled apparatus, means for reading and comparing data on a plurality of records one with another, and means controlled by said first named means for controlling the subsequent operation of the apparatus.

58. In a perforated-card-controlled machine, means for feeding perforated master cards, means for feeding perforated audit cards, means for comparing perforated number data on said cards, and means brought into operation when the perforated number data on said cards agrees for posting additional data upon said master card.

59. In a perforated-card-controlled machine, means for feeding perforated master cards, means for feeding perforated audit cards, means for comparing perforated number data on said cards, a file and a reject station for each of said cards, and means brought into operation when the number on one card is greater than that on the other for feeding one of the cards to its reject station.

60. In a record-controlled machine, means for feeding mated records through the machine, means for comparing the records being fed through the machine, and means brought into operation by said comparing means when the position of a record is in advance of its mate for suspending the feeding of said advanced record.

61. In a record-controlled machine, a comparing station, means for feeding mated records simultaneously through said station and through the machine, means for comparing the records at said station, and means brought into operation by said comparing means when the position of a record at said station is in advance of its mate for causing said advanced record to be held at said station until the arrival of its mate.

62. In a record-controlled machine, a comparing station, means for simultaneously feeding records from a plurality of groups through said station, means for comparing the ordinal relation of the records of the several groups at said station, and means controlled by said comparing means for controlling said feeding means and adapted when a record of one group is in delayed relation with that of another group at said station to cause the delayed record to be advanced and the other to be delayed.

63. In a record-controlled apparatus, means for feeding a plurality of records simultaneously, and means adapted to compare certain items on said records and to differentially control the subsequent operation of the apparatus.

64. In a perforated-card-controlled machine, means for feeding perforated master cards, means for feeding perforated audit cards, means for comparing data on said master card with data on said audit card, means for comparing data on said audit card with a set-up in the machine, a file pocket and a reject pocket for each of said cards, and means brought into operation when the compared data on the two cards matches and the compared data on the audit card and the set-up in the machine fails to match for feeding the master card to its file pocket and the audit card to its reject pocket.

65. In a record-controlled machine, means for sensing data on a plurality of records, a set-up device, means for comparing data in a plurality of zones on one of the records with said device, and data-posting means controlled by said sensing and comparing means.

66. In a record-controlled machine, perforation-sensing means with provisions for sensing a plurality of record sheets, a punch for perforating a record, a hammer for actuating said punch, a dog for actuating said hammer, and means controlled by said sensing means for controlling the operation of said dog.

67. In a record-controlled machine, a plurality of punches for perforating a record, a plunger movable to operative relation with any of said punches for actuating the same, a single hammer for actuating said plunger, and card-reading means for controlling said hammer.

68. In a record-controlled machine, means for sensing data on a plurality of correlated records, a plurality of punches for perforating one of the records bearing said data, a plunger movable to operative relation with any of said punches for actuating the same, and a hammer for actuating said plunger, said hammer being controlled by said sensing means.

69. In a record-controlled machine, means for sensing data on a plurality of correlated records, a plurality of combination combs positioned under control of said sensing means, a plurality of punches for perforating one of the records bearing said data, a plunger movable to operative relation with any of said punches for actuating the same, and a hammer for actuating said plunger, said hammer being controlled by the relative positions of said combs.

70. In a posting machine, a plurality of sets of punches for perforating a record, a plunger associated with each of said sets, each plunger being movable into operative relation with any of the punches of its set, an actuating hammer for each plunger, and selective means for causing operation of said hammers.

71. In a posting machine, a plurality of sets of punches for perforating a record, a plunger associated with each of said sets, each plunger being movable into operative relation with any of the punches of its set, an actuating hammer for each plunger, and record controlled means for selectively causing operation of said hammers.

72. In a posting machine, a plurality of sets of punches for perforating a record, a plunger associated with each of said sets, each plunger being movable into operative relation with any of the punches of its set, an actuating hammer for each plunger, means for sensing data on a plurality of correlated records, and means controlled by said sensing means for selectively bringing said hammers into operation.

73. In a record-controlled machine, means for sensing data on records, a punch for perforating a record controlled thereby, a plurality of record-receiving pockets, means for feeding records to said pockets, and means controlled by the operation of said punch for selectively controlling the feeding of records to said pockets.

74. In a record-controlled machine, data-sensing means, combination combs positioned under control of said sensing means, posting combs positioned under control of said combination combs, a plurality of bails controlled in accordance with the relative positions of said posting combs, and record posting means controlled by said bails.

75. In a record-controlled machine, means for feeding records from a plurality of stacks, a plurality of receiving pockets, means for comparing data on records taken from one stack with data on records taken from another stack, and means controlled by said comparing means for selectively feeding said records to said pockets.

76. In a perforated record-controlled apparatus in combination with record-reading appliances, means for comparing two records having controlling perforations, and means for posting data upon one of the records if the controlling perforation of both records agree.

77. In a perforated record-controlled apparatus in combination with record-reading devices, means for comparing the controlling perforations of two records, means for comparing certain perforations in the records with set-up devices in the machine, and means for effecting a posting of data upon one of the records if they both compare with each other and with the set-up of the machine.

78. In a perforated record-controlled apparatus, combination means for simultaneously reading the perforations of two coordinated records, and means for diverting one record if certain of its perforations do not agree with those of the other record.

79. In a perforated record-controlled apparatus, in combination with means for feeding a plurality of records through the machine to separate filing stations, means for comparing the perforations of two records and means controlled by the aforesaid comparing means for controlling the delivery or non-delivery of the said records to their filing stations.

80. In a perforated record-controlled apparatus, in combination with means for feeding a plurality of records through the machine to separate filing stations, means for comparing the perforations of two records, means for comparing perforations of one of the records with set-up devices in the machine and means controlled by the aforesaid comparing means for controlling the delivery or non-delivery of the said records to their filing stations.

81. In a perforated record-controlled apparatus, in combination with means for feeding a plurality of records through the machine to separate filing stations, means for comparing the perforations of two records and means controlled by the aforesaid comparing means upon the dissimilarity of controlling perforations for suspending the advancing of one record to its filing station until another record is received which compares with its perforations.

82. In a perforated record-controlled apparatus, in combination with means for feeding a plurality of records through the machine to separate filing stations, means for comparing the perforations of two records to determine their agreement or disagreement, means for comparing the perforations of one record with set-up in the machine and means controlled conjointly by the aforesaid comparing means for controlling the delivery or non-delivery of a record to its filing station for suspending the advancing of one record until another record is received which properly compares therewith and with the set-up of the machine.

83. In a record-controlled machine, means for comparing characteristics representing a plurality of numbers, and means for controlling the operation of the machine in accordance with the relative values of such numbers.

84. A machine of the class described having an item comparer adapted to be controlled in accordance with the relative values of a plurality of items, and means controlled by said item comparer for controlling operation of the machine in accordance with the relative values of the compared items.

85. In a machine of the class described, means for comparing items on a plurality of cards, zone-selecting means, and means controlled by said comparing means and said zone-selecting means for effecting a record on one of the cards.

86. In a machine of the class described, means for sensing data on a plurality of records, zone-selecting means, and means controlled by said data-sensing and said zone-selecting means for applying data to one of the records.

87. In a record-controlled apparatus, means for feeding a plurality of records into operative positions, a value comparer for comparing certain items on such records, and means controlled by said comparer for controlling the subsequent operation of the apparatus.

88. In a record-controlled apparatus, means for feeding a plurality of records into operative positions, a value comparer for comparing certain items on such records, and means controlled by said comparer for controlling certain operations of the apparatus.

89. In a card-controlled machine, separate means for feeding a plurality of cards simultaneously, means for reading said cards simultaneously and means controlled by said reading means for controlling said feeding means.

90. In a record-controlled machine, means for comparing opposing items on records, and means for differentially controlling the machine in accordance with the relative values of the compared items.

91. In a data-comparing machine, means for sensing data on a plurality of records successively, additional data-controlled elements, means for comparing said sensed data with said elements, and means brought into operation when data represented in said elements is not matched by the data being sensed for effecting a predetermined operation of the machine.

92. In a card selecting mechanism, the combination of means adapted to receive a guide card bearing certain perforations therein, said means also being adapted to pass therethrough a series of data cards also bearing various perforations, means including elements engaging in certain perforations on said guide card, said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein.

93. In a card selecting mechanism, the combination of means adapted to receive a guide card bearing certain perforations therein, said means also being adapted to pass therethrough a series of data cards also bearing various perforations, means including elements engaging in certain perforations on said guide card, said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein, and means adapted to thereupon remove said guide card from said card receiving means.

94. In a card selecting mechanism, the combination of means adapted to receive a guide card bearing certain perforations therein, said means also being adapted to pass therethrough a series of data cards also bearing various perforations, means including elements engaging in certain perforations on said guide card, said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein, and means adapted to remove said guide cards and similarly position a second guide card in said card receiving means.

95. In card selecting mechanism, the combination of means adapted to pass therethrough a series of guide cards bearing variously arranged perforations therein, other means adapted to pass therethrough a series of data cards also bearing variously arranged perforations, and selecting means actuated by certain perforations in said guide cards, said means being adapted to select and remove from said mechanism any of said data cards having an arrangement of perforations identical with those on said guide card simultaneously passing through said first named means.

96. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having an arrangement of perforations in one predetermined group therein identical with the perforations in a corresponding group in said guide card passing simultaneously through said first named means.

97. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations.

98. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations, means adapted to receive cards selected by said selecting means and other means adapted to receive said data cards not selected by said selecting means.

99. In a data analyzing device, means for reading characteristics representing a plurality of numbers, means for ascertaining the relative values of such numbers and means controlled by said ascertaining means for controlling the operation of the machine.

100. In a data analyzing machine, means for reading characteristics representing a plurality of numbers, means for ascertaining the ordinal relationship of such numbers and means controlled by said ascertaining means for controlling the operation of the machine.

In testimony whereof 1 hereto affix my signature.

JOHN ROYDEN PEIRCE.